(12) United States Patent
Hawkins

(10) Patent No.: US 8,613,120 B2
(45) Date of Patent: Dec. 24, 2013

(54) CUSHIONING DEVICE AND METHOD OF MANUFACTURING

(75) Inventor: Steven D. Hawkins, Midlothian, VA (US)

(73) Assignee: Carpenter Co., Richmond, VA (US)

( * ) Notice: Subject to any disclaimer, the term of this patent is extended or adjusted under 35 U.S.C. 154(b) by 480 days.

(21) Appl. No.: 12/880,613

(22) Filed: Sep. 13, 2010

(65) Prior Publication Data

US 2011/0067183 A1 Mar. 24, 2011

Related U.S. Application Data

(60) Provisional application No. 61/243,680, filed on Sep. 18, 2009.

(51) Int. Cl.
*A47C 17/00* (2006.01)

(52) U.S. Cl.
USPC .................. 5/740; 5/655.9; 5/953; 5/731

(58) Field of Classification Search
USPC .......... 5/740, 655.9, 953, 731, 691, 727, 728, 5/756, 944
See application file for complete search history.

(56) References Cited

U.S. PATENT DOCUMENTS

| | | | |
|---|---|---|---|
| 2,371,788 A | | 3/1945 | Weeber |
| 2,619,659 A | * | 12/1952 | Futterknecht .................. 428/102 |
| 2,830,306 A | * | 4/1958 | Wagner et al. ..................... 5/722 |
| 2,865,435 A | * | 12/1958 | Bramson et al. ............... 5/657.5 |
| 3,197,357 A | | 7/1965 | Schulpen |
| 3,205,515 A | * | 9/1965 | Unger ........................... 428/101 |
| 3,242,511 A | * | 3/1966 | Fultz et al. ...................... 5/655.9 |
| 3,323,152 A | * | 6/1967 | Lerman .......................... 5/655.9 |
| 3,394,414 A | * | 7/1968 | Unger ........................... 5/655.9 |

(Continued)

FOREIGN PATENT DOCUMENTS

| | | |
|---|---|---|
| FR | 1.281.638 | 1/1962 |
| FR | 2 696 918 | 4/1994 |

(Continued)

OTHER PUBLICATIONS

PCT Notification Concerning Transmittal of International Preliminary Report on Patentability (Form PCT/IB/326) issued Mar. 29, 2012 for International Application No. PCT/US2010/048560.

(Continued)

*Primary Examiner* — Robert G Santos
*Assistant Examiner* — David E Sosnowski
(74) *Attorney, Agent, or Firm* — Smith, Gambrell & Russell, LLP

(57) ABSTRACT

A cushioning device with an upper foam layer and a lower positioned foam layer, with the upper foam layer having multiple thickness zones defined by different height projections from one zone to another as to provide a thickness variation pattern, one side of the upper foam layer is less contoured when not yet assembled in the cushioning device and a second side is comprised of the multiple thickness zones such that, upon connection of the multiple thickness zones to the lower positioned foam layer, the height differential along a length of the upper foam layer is transmitted as to form a non-planar, crown configuration in the upper surface of the upper foam layer. A method includes roller contouring different height and shaped projection zones including zones with different ratios of peak height to overall zone height.

36 Claims, 22 Drawing Sheets

(56) References Cited

U.S. PATENT DOCUMENTS

| | | | |
|---|---|---|---|
| 3,553,748 A * | 1/1971 | Ross | 5/653 |
| 4,021,871 A * | 5/1977 | Wortman | 5/636 |
| 4,106,139 A | 8/1978 | Southard | |
| 4,207,636 A * | 6/1980 | Ceriani | 428/101 |
| 4,276,666 A * | 7/1981 | Yamada | 5/736 |
| 4,620,337 A | 11/1986 | Williams | |
| 4,686,724 A | 8/1987 | Bedford | |
| 4,741,058 A | 5/1988 | Williams | |
| 4,791,687 A * | 12/1988 | Iwase | 5/708 |
| 4,955,096 A | 9/1990 | Gilroy | |
| 4,972,535 A * | 11/1990 | Goldman | 5/731 |
| 5,077,849 A * | 1/1992 | Farley | 5/730 |
| 5,111,542 A * | 5/1992 | Farley | 5/727 |
| 5,193,236 A * | 3/1993 | Komuro | 5/636 |
| 5,317,768 A | 6/1994 | Klancnik | |
| 5,319,814 A | 6/1994 | Dyer, Jr. | |
| 5,537,703 A * | 7/1996 | Launder et al. | 5/636 |
| 5,669,094 A | 9/1997 | Swanson | |
| 6,018,832 A * | 2/2000 | Graebe | 5/654 |
| 6,098,224 A * | 8/2000 | Gladney | 5/716 |
| 6,199,234 B1 * | 3/2001 | Srour et al. | 5/736 |
| 6,272,707 B1 * | 8/2001 | Robrecht et al. | 5/724 |
| 6,578,220 B1 | 6/2003 | Smith | |
| 6,602,579 B2 | 8/2003 | Landvik | |
| 6,701,557 B2 * | 3/2004 | Barman | 5/730 |
| 6,704,961 B2 * | 3/2004 | Kienlein | 5/730 |
| 6,782,575 B1 * | 8/2004 | Robinson | 5/740 |
| 6,866,915 B2 | 3/2005 | Landvik | |
| 7,191,483 B2 | 3/2007 | Hoschschild | |
| 7,334,280 B1 | 2/2008 | Swartzburg | |
| 7,520,012 B2 | 4/2009 | Robins | |
| 7,685,664 B2 * | 3/2010 | Stolpmann et al. | 5/731 |
| 7,886,385 B2 * | 2/2011 | Carlitz | 5/691 |
| 8,209,804 B2 * | 7/2012 | Apperson et al. | 5/691 |
| 2003/0221262 A1 | 12/2003 | Torbert | |
| 2004/0237206 A1 | 12/2004 | Webster et al. | |
| 2006/0260059 A1 * | 11/2006 | Apperson et al. | 5/691 |
| 2007/0028389 A1 * | 2/2007 | Wu | 5/706 |
| 2007/0044245 A1 * | 3/2007 | Bryant et al. | 5/727 |
| 2011/0035879 A1 | 2/2011 | Grinstead et al. | |
| 2011/0252572 A1 * | 10/2011 | Morrison | 5/740 |

FOREIGN PATENT DOCUMENTS

| | | |
|---|---|---|
| GB | 2 161 376 | 1/1986 |
| JP | 7-265176 | 10/1995 |
| JP | 10-57197 | 3/1998 |
| JP | 2004-243007 | 9/2004 |
| JP | 2005-118097 | 5/2005 |
| JP | 2005-137596 | 6/2005 |
| JP | 2008-295692 | 12/2008 |

OTHER PUBLICATIONS

PCT International Preliminary Report on Patentability (Form/IB/373) issued Mar. 20, 2012 for International Application No. PCT/US2010/048560.

PCT Notification of Transmittal of the International Search Report and the Written Opinion of the International Searching Authority, or the Declaration (Form PCT/ISA/220) dated May 20, 2011 for International Application No. PCT/US2010/048560.

PCT International Search Report (Form PCT/ISA/210) issued May 20, 2011 for International Application No. PCT/US2010/048560.

PCT Written Opinion of the International Searching Authority (Form/ISA/237) issued May 20, 2011 for International Application No. PCT/US2010/048560.

* cited by examiner

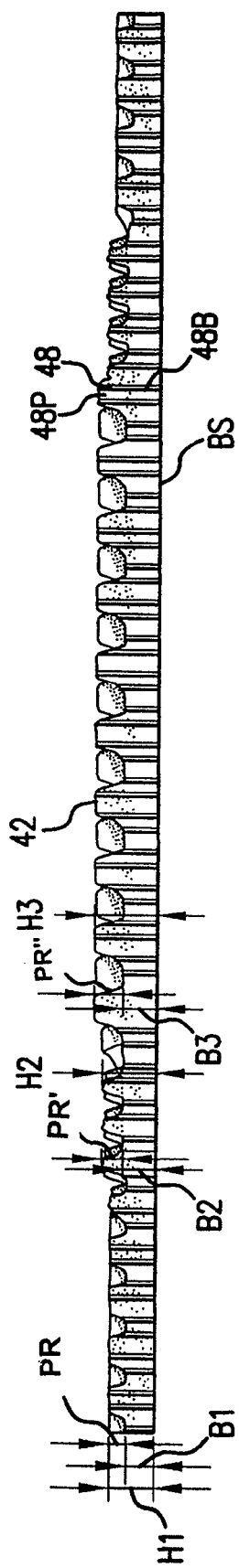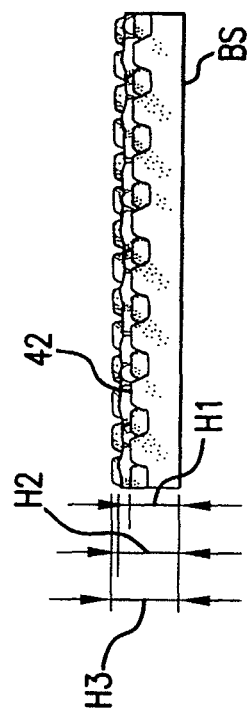
FIG.7
FIG.8

CUSHIONING DEVICE AND METHOD OF MANUFACTURING

CROSS REFERENCE TO RELATED APPLICATIONS

The present application claims the priority date of U.S. Provisional Patent Application No. 61/243,680 filed on Sep. 18, 2009, which application is incorporated herein by reference in its entirety.

SUMMARY OF DISCLOSED INVENTION EMBODIMENTS

An embodiment of the disclosure includes a cushioning device having a first foam layer and a second foam layer positioned below the first foam layer when the cushion device is in use. The first foam layer including a first or upper surface and a second or lower surface. The second foam layer including a first or upper surface and a second or lower surface. The lower surface of the first foam layer is preferably connected to the upper surface of the second foam layer either directly or indirectly. Also, the second or lower surface of the first foam layer is non-planar as in a contoured (e.g., convoluted) surface such as a contoured surface comprised of a plurality of projections and recesses. Thus, when connected, the second foam layer has its first or upper surface facing the second or lower surface of the first foam layer.

An embodiment of the disclosure includes an arrangement wherein the first foam layer has a varying thickness at least along a portion of its length of elongation. As an example, there is provided a first foam layer having, when formed, its second or "in use" lower side with varying height projections along its length of elongation, which varying heights are transmitted to the upper surface of the first layer upon securement of the first foam layer and the second foam layer in the cushioning device. For example, the different height projections of the lower surface of the first foam layer are arranged along the longitudinal length of the first foam layer as to form a crown in the upper surface of the cushioning device upon assembly of the cushioning device. Further, an embodiment of the disclosure provides a mattress device (e.g., a mattress topper, mattress, mattress cover or mattress core) which has, for example, the standard length and width dimensions utilized for mattress devices in the field and one or more different thickness region or regions along the length of elongation of that mattress device. In one embodiment there is provided a varying thickness that results in an intermediate region of the mattress (at least with respect to a direction of elongation) having a greater thickness than a less intermediate area of that first foam layer.

An embodiment illustrating such an arrangement includes, a first foam pad with a first end region (e.g., a feet support end region) and a second end region (e.g., a head support region) with each end region having a lesser thickness than an intermediate, thicker region (e.g., a thicker torso comfort region). For example, in an embodiment of the disclosure, even though the middle (torso) region is thicker, it represents a softer feel region (e.g., by its contoured undersurface configuration and/or through a configuration and positioning of ventilation holes) that manifests itself as a higher pressure relief region relative to adjacent intermediate and/or end regions.

An embodiment of a cushioning device includes a combination of upper and lower foam layers with the upper foam layer having multiple thickness zones as in a low-medium-high-medium-low thickness variation pattern. An embodiment includes one side of the first foam layer that is planar when not yet assembled in the cushioning device and a second side comprised of a non-planar contoured surface that includes the contoured, different height projections. Upon securement of the first foam layer's different projection height zones to a planar surface of a supporting base foam layer, the height differential along the longitudinal length of the first foam layer is transmitted as to form a non-planar, smooth surfaced crown configuration in the upper surface of the first foam layer (user facing).

The projections and recesses formed in the first layer are formed with contouring means as in a convolution system (compression tool rollers with cutting blade), contour cutting (e.g., CNC saw cutting), molding or some alternate means for providing a contoured surface in the first foam layer. An embodiment includes the formation of projections and recesses in a foam layer through a convolution process as in a compression die roller arrangement which forms essentially mirror image contoured surfaces in two or more output products. The output products each feature a convolution surface that can be utilized as the first foam layer with proper convoluted surface orientation (e.g., convolution surface facing downward toward the second foam layer). The variation in height, for example, can be achieved by different valley depths and projection heights within the noted different zones, as in the central region having the deepest depressions and highest projection heights and end zones having less deep depressions and less height projections.

In addition to (or alternatively to) the above-described different height regions or zones on the underlying surface of the first foam layer, an embodiment of the disclosure comprises a cushioning device such as a mattress device with the first foam layer having a multitude of different configured or shaped longitudinal zones, as in zones of different projection/recess configuration(s) (inclusive of planar region(s) between one or more of the noted projection/recess region(s)). An embodiment of the cushioning device includes one where the first foam layer comprises a combination of both different height and different configuration projection/recess zones relative to the longitudinal direction of the contoured first layer. As an example, there is featured two or more (e.g., 3 to 7 different configured zones along the length of the first foam layer and hence the cushioning device when the first foam layer is connected to the second foam layer). The longitudinal length of each or some of the respective zones are of different lengths in an embodiment, although in an alternate embodiment each zone length is equal.

An embodiment includes a combination of non-bulbous or flat peak projections and adjacent recesses in one or more zones in the first layer and/or a combination of ridges and valleys in one or more zones in the first layer to form a plurality of differently configured pattern zones in that first layer. An embodiment includes a head zone of a peak and valley combination of a first style, a ridge (e.g., a continuous wavy ridge) and valley combination for a shoulder zone region, a torso intermediate zone of a peak and valley combination of a second peak/valley style, a second ridge (e.g., a continuous wavy ridge) and valley combination for a leg zone and a final zone of a peak and valley combination as in a style similar to the head zone. In one embodiment, each of the projections in the peak and valley combination have a flattened or non-bulbous free end contact surface and/or the ridges are provided with essentially flat top contact surfaces.

An embodiment of the disclosure features one or more end zones with projection and recess contouring, with those projections having free end projection contact regions (designed for connection relative to an underlying top surface of a second foam layer) that represent 30 to 40% of the area of the respective zone in which they are present. An embodiment features a resulting convoluted foam surface that has opposite end zones that each have projections whose free contact ends form a contact region that encompasses 30-40% of the total area of those zones. An embodiment also features a pair of intermediate zones positioned between a respective end zone and a middle (e.g., central) zone, with the intermediate zones having projections and recesses that have free end projection contact surfaces that encompass 20-30% of the area of the zone in which they are present, while the middle zone has a projection and recess configuration that has the free end contact surfaces that encompasses 20-30% of the area of the middle zone.

An embodiment of the disclosure has the first foam layer formed with an intermediate most zone (e.g., a central zone) that is of a greater thickness relative to its end regions. This results in an intermediate highest height region in the user facing surface in the cushioning device once the first foam layer and second layer are connected. There is thus provided in this embodiment an upward slope in going from each end toward the center of the cushioning device which is brought about by the different thickness zones in the first foam layer. Also, in an embodiment, the rise from one end to the center is the same or within 15% of the slope going down from the center to the other end (e.g., a generally symmetric longitudinally left and right configuration). Also, there is featured in an embodiment a relative percentage increase of over 7.5% and more preferably over 10% in thickness in going from end to center (e.g., about 12 to 15%). Also, a longitudinal halfway point between a cushioning device end and the maximum thickness location preferably represents the half-way point relative to the sloped increase (decrease) between the maximum thickness location and the end of the contoured layer (e.g., an essentially continuous and uninterrupted slope line from end to center of the cushioning device).

The cushioning device of the disclosure features a second, base foam layer which in an embodiment is formed of a different characteristic or quality of foam as compared to the foam of the first layer (e.g., different type of foam or quality in the foam as in an upper layer of viscoelastic foam and a base layer of non-viscoelastic polyurethane foam such as a high resiliency polyurethane foam or a latex foam layer). Also, an embodiment features the second foam layer having a planar presentment surface facing the contoured, non-planar undersurface of the first foam layer. In an embodiment, a convoluted undersurface of the first foam layer is placed in direct contact with the upper, presentment surface of the second foam layer as in a direct adhesion contact between the free ends of the projections and a planar facing surface in the second foam layer or base layer. In an alternative embodiment, the presentment surface of the second or base foam layer is also provided with a contoured surface suitably configured to provide base support contact relative to the contoured surface of the first foam layer to be joined to the second foam layer. The second foam layer is preferably of a greater thickness than the first foam layer as in a 1.5/1 to 4/1 ratio between the maximum thickness of the base layer and the maximum thickness of the first foam layer.

Alternate embodiments include non-direct connections between the above-described contoured undersurface first layer and the second foam layer, as in foam or non-foam intermediate layer(s) such as a densified non-woven layer or layers positioned between the first and second foam layers, or different characteristic foam layer(s). With such an intermediate (e.g., third) layer addition, an embodiment features a thinner, relative to the second foam layer, intermediate layer and preferably an intermediate layer that is also thinner, the same or thicker than the first foam layer's thickness. In one embodiment there is provided a latex material layer sandwiched between a viscoelastic contoured topper layer and a polyurethane base layer.

Also, in an embodiment of the cushioning device, the first foam layer is a ventilated (e.g., perforated) foam layer, as in a foam layer with a plurality of through-holes extending through the first foam layer. An embodiment of the ventilated layer features through-holes that extend through to open recessed regions positioned between projections in one or more of the multiple zones in the first layer (e.g., a different thickness and/or different configured longitudinal spaced multiple zones in the first layer) and in all of the multiple zones in some embodiments of the disclosure. An embodiment includes ventilation through-holes that also extend through to the free end of the projections in the first foam layer and are thus covered over with an underlying layer (e.g., the second foam layer) that is connected to the free ends of the projections of the first foam layer.

In an embodiment there is featured a zoned convoluted topper foam region providing a non-planar cut surface in that foam body. This non-planar surface in this embodiment is provided by having the middle zone as a deeper convolute (thicker peak and thinner base) than the outer zones; giving a natural "crown" to the cushioning device (e.g., mattress) upon assemblage of the components of the cushioning device.

Embodiments of the disclosure include foams for the topper that are viscoelastic as in viscoelastic polyurethane (illustrative embodiment having a minimum 2.5 lb/ft$^3$ (40.0 Kg/m$^3$) density), as well as other types of polyurethanes (e.g., those with a minimum density of 1.2 lb/ft$^3$ (19.2 Kg/m$^3$) inclusive of high-resilience polyurethane (illustrative embodiment having a 1.8 lb/ft$^3$ (28.8 Kg/m$^3$) minimum density), and latex (as well as, for example, combinations of these material either relative to a stacked different height relationship or a longitudinally sequenced spacing in a common layer).

Embodiments of the disclosure also include first or topper foams, such as of those materials described above (e.g., viscoelastic, latex, etc.), that have a 25% IFD (indentation force deflection) range of from 5 lbs to 40 lbs (2.27 Kg to 18.14 Kg), per ASTM D3574, Test $B_1$.

Embodiments of the disclosure further include a cushioning device comprising:
a first foam layer having at least one of a) to c) below, or all of a) to c) below, or any sub-combination of a), b) and c) presented below;
  a) a first foam layer that has different thickness values along a longitudinal length of that first foam layer as in one generated by different contour projection heights.
  b) a first foam layer that has a multitude of different presentment configurations in the contact surface as in a plurality of different surface configuration zones which zones are inclusive of one or more different contour patterns as in different projection/recess configurations in one or more zones of the contoured surface.
  c) a first foam layer having ventilation means as in a plurality of through-holes or perforations in one or more zones or across the entire user facing surface (e.g., perforations in all zones).

An embodiment of the cushioning device further includes the base layer as a monolithic solid foam body such as in a base foam layer comprised of a foam that is the same or a different characteristic foam as featured in the first foam layer. Embodiments include having the second foam layer of a different material than that of the first foam layer as in a viscoelastic material for the contoured first foam layer and a different foam type for the second foam layer as in a member of the polyurethane foam family which is inclusive of high-resiliency polyurethane foam for the second foam layer supporting a viscoelastic foam layer for the first foam layer. Also, the second foam layer is in some embodiments thicker than the maximum thickness in the first foam layer and also the second foam layer is in some embodiments of a higher 25% IFD value than that of the first foam layer and of a lesser density.

If a ventilated cushioning device is featured, embodiments include a perforation hole size of 0.375" (0.9 cm) diameter to 2" (5.08 cm) diameter (or equivalent area if non-circular holes). Also, various hole patterns (spacing and hole size) within the first foam layer are also representative of alternate embodiments of the disclosure.

In an alternate embodiment, there is featured for the upper portion of the cushioning device a laminate combination of two foam pads as in two visco foam pads (with the pads being of the same grade or of different grades) for this top layer region of the cushioning device. In an embodiment this laminated arrangement is accomplished by gluing a zoned convoluted visco foam to another flat visco foam piece and then perforating this laminate combination together. The convoluted surface of the topper foam region is then, in an embodiment of the disclosure, adhered directly to the base foam region and can be formed in only the below most surface of the laminate stack or in the below surface of more than one layer representing the laminate upper portion of the cushioning device (which provides for a compound build up in crown height following transmission to the user side). In another embodiment there is provided an intermediate layer between a viscoelastic foam topper layer (as in the contoured first foam layer described above) and a polyurethane foam base layer such as those described herein for the base, second layer.

Also, the maximum thickness of the upper foam region in the cushioning device is preferably in a range from 1.5" (3.81 cm) to 5" (12.7 cm) for a single contoured foam layer and 1.5" (3.81 cm) to 8 "(20.32 cm)" relative to a laminate topper foam region like that described above.

A variety of materials can be used for the base foam layer as in polyurethane (an illustrative embodiment having a minimum 1.5 lb/ft$^3$ (24.03 Kg/m$^3$) density), high-resilience polyurethane (an illustrative embodiment having a minimum 1.8 lb/ft$^3$ (28.8 Kg/m$^3$) minimum density), or latex or laminates thereof. Also, embodiments featuring a higher thickness base include, for example, a thickness of 2.5 inches (6.35 cm) to 12 inches (30.48 cm) in the base layer.

An embodiment of the disclosure includes a cushioning device in the form of a mattress device comprised of a first, topper layer and a second, base layer. The undersurface of the first layer being connected to an upper surface of the second layer. The first layer having a contoured undersurface defining multiple zones of different configured foam projections and recesses and having free end projection surface connected to the upper surface of the second layer. The multiple zones further including different height projections, as when produced in a contouring process, that form one or more crowns in the user facing upper surface of the first layer. The upper layer further including ventilation through-holes extending through the first layer in one or more of said multiple zones. The upper layer also being formed of a different foam material than the base layer including an upper layer formed of a viscoelastic foam of 2.5-6 pcf (40 to 96 Kg/m$^3$) and a 25% IFD value of 5-40 lb (2.27 Kg-18.1 Kg) and the base layer being of a polyurethane as in one that has a lower density than the upper layer with a first embodiment being a polyurethane foam base layer with a range of 1.5-4.0 pcf (24 to 64 Kg/m$^3$) with a 20-50 lb (9.1 Kg to 22.7 Kg) 25% IFD range; and a second embodiment featuring a high resiliency polyurethane foam of 1.8-5.0 pcf (28.8 to 80.1 Kg/m$^3$) density and 15-50 lb (6.8 to 22.7 Kg/m$^3$) 25% IFD. In addition, the base layer preferably is of a greater thickness than the maximum height thickness value for the upper layer and of a higher 25% IFD value than the upper layer.

In an embodiment of a manufacturing process under the present disclosure, the cushioning device is formed by—
a) Providing holes in a slab of foam from which the upper foam layer is provided (as by way of a punch press device);
b) Contouring the perforated piece to provide a multi-zoned contour pattern. (contouring including, for example, convoluting as in a convoluting technique involving feeding one foam piece in (e.g., the slab generated in step a)) above and an output of two essentially mirror image pieces as in a "no scrap" generated process or, as another example of contouring means, a contour cutting technique such as a CNC saw cutting process).
c) Joining the first and second foam layers as by using an adhesive applicator, as in roll coat laminator, to apply adhesive to the tips of the convoluted pad and to adhere the topper (upper layer) to the core piece of foam (base layer), which core piece may be, for example, a polyurethane inclusive of, for example, high resilience polyurethane, or latex, or combinations of these.

In an alternate manufacturing technique for forming a cushioning device under the present disclosure there is carried out the following sequence of steps:
a) Contouring as by convoluting to provide a contoured first foam layer;
b) Perforating the contoured first foam layer; and
c) Same as "c" above for a joining step.

In an alternate embodiment the upper layer and base layer are secured prior to carrying out a ventilation process such as a punch press process.

BRIEF DESCRIPTION OF ILLUSTRATED EMBODIMENTS

FIG. 7 shows a side elevational view of the topper pad shown in FIG. 6.

FIG. 8 shows an end elevational view of the right end of the topper pad shown in FIG. 6.

DETAILED DESCRIPTION OF ILLUSTRATED EMBODIMENTS

Figure 1:
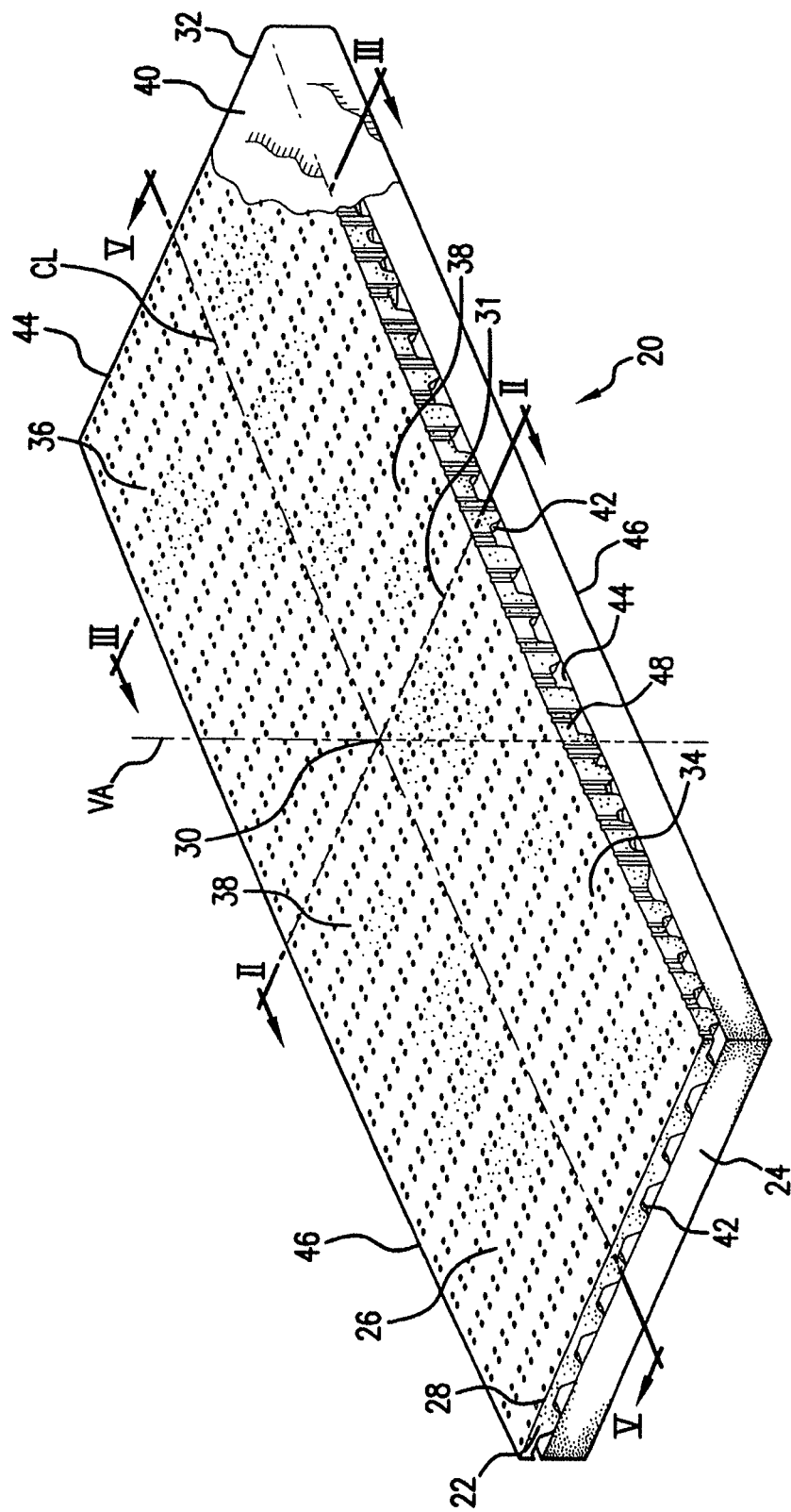
FIG. 1 shows a perspective view of a cushioning device embodiment of the present disclosure.

FIG. 1 shows a perspective view of a first embodiment of cushioning device 20 comprising first foam layer 22 and second foam layer 24. As shown in this embodiment, first foam layer 22 represents an upper or topper layer relative to second foam layer 24. Thus, second foam layer 24 represents a lower or base layer relative to first foam layer 22. Cushioning device 20 can take on a variety of forms such as a mattress device (e.g., a mattress, mattress core, mattress topper, futon cushion, pet bedding, outdoor lounge cushion or the like) or alternate cushioning means as in a seating cushion (e.g., a wheel chair seat cushion, a furniture cushion as in a seat or sofa, or an indoor or outdoor seat cushion, etc.).

In the FIG. 1 embodiment, first foam layer 22 is shown as having a non-convoluted (or smooth) upper surface 26 which is non-planar in view of the rise and fall configuration in the upper surface 26 along the direction of elongation of first foam layer 22. This rise and fall configuration in the upper surface 26 of first foam layer 22 produces a non-planar "crown" configuration in the upper surface 26 of cushioning device 20 with the maximum height of the crown being in an intermediate region (e.g., centralized location) of the upper layer 24 and, hence, upper surface 26.

Figure 5:
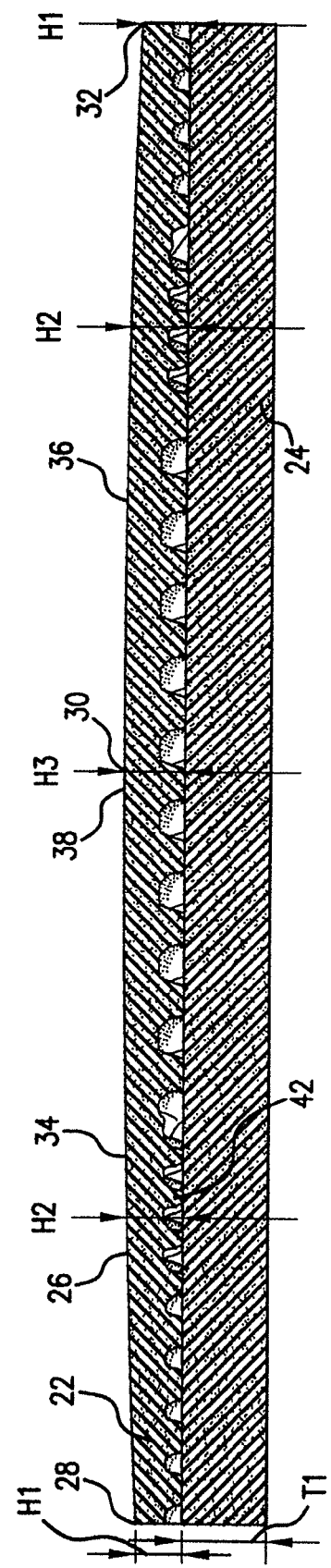
FIG. 5 shows a cross-sectional view taken along line V-V in FIG. 1.

FIG. 5 shows a longitudinal cross-sectional view taken along cross-section line V-V in FIG. 1 which further illustrates the rise and fall crown producing configuration in upper surface 26. As seen from FIGS. 1 and 5, first foam layer 22 has a first end 28 represented by a first upper corner edge of upper layer 22 and a second end 32 represented by a second upper corner edge of upper layer 22. In the embodiment of FIG. 1, where the upper and lower layers 22 and 24 have essentially the same periphery configuration and size and are layered as to have coincident sides and ends, the first and second upper layer ends 28 and 32 represent the ends of the cushioning device as well. Central point 30 falls longitudinally between ends 28 and 32 with central point 30 shown as being central both lengthwise and widthwise relative to cushioning device 20. Central point 30 is also the location through which both vertical line VA and horizontal widthwise (or laterally) extending line 31 extend. Widthwise line 31 is shown at a right angle to vertical line VA and also generally parallel to edges 28 and 32. Also, in the embodiment illustrated, widthwise line 31 is coincident with cross-section line II-II shown as extending through the maximum height location in upper surface 26. Also, central longitudinal line CL extends at right angles to each of vertical line VA and widthwise line 31.

The peak height location for the crown region is preferably at an intermediate region of first foam layer. In an embodiment, the crown peak, is at, or about at (e.g., within 10% for this feature), the location that widthwise line 31 intersects the central point 30 location. In alternate embodiments, the crown peak is shifted longitudinally toward one end or the other (e.g., a still intermediate 25% (relative to overall length) adjustment along the longitudinal from the centralized widthwise line 31 in either direction). In this way a different upper surface 26 crown configuration is provided. For example, while a centralized crown peak is preferred, a shifting (or addition) of the (a) crown peak (or another crown peak) to a foot region and/or a head region represents alternate embodiments of the disclosure inclusive of a personalized sizing program (e.g., a pressure point sensing location for which a user can be tested to strategically align the crown peak with a preferred support region of the user as in a smaller back region of a purchasing user who prefers "on back" sleeping or has back trouble). Thus, in some embodiments of the disclosure, a lateral cross-section line through the maximum peak of a crown may be off-center from the central line location represented by line 31 extending through central point 30 of the cushioning device 20.

As also seen from the view of FIG. 5, the upper surface 26 features a rising section 34, as in a sloped surface section rising up from the end edge 28 to the widthwise line 31 or crown peak location. The slope pattern is preferably a generally straight line slope or convex curve or combination up to a curved peak with a "vertex" or uppermost edge line of that curved peak represented by widthwise line 31 and a generally straight line slope or convex curve or combination back down. In alternate embodiments there can be provided more drastic different height differentiations in the below described projection/recess zones, which provides a more distinct multi step pattern in going from one zone to another along the longitudinal as well as convex-concave surface regions as in a combination with an overall upward rise to a crown location. Also, in embodiments featuring the fastening of the upper layer to the lower layer (directly or indirectly as in a direct adhesion fastening of the upper layer to the lower layer) there can be provided a smoothened bridge or averaging out effect in the transition or interface region between one different height zone to the next.

In FIG. 1, rising section 34 of upper surface 26 is to the left of widthwise line 31 and represents the portion of upper surface 26 between end 28 and the uppermost point in upper surface 26 of the first foam layer 22 (which in this embodiment is represented by both cross-section line II-II and the coincident lateral line 31).

In the illustrated embodiment of FIG. 1 there is featured a symmetrical relationship in upper surface 26 such that there is further featured a sloped upper surface section 36 to the right of central widthwise line 31, with surface section 36 dropping in height in going from the center to end edge 32. In the FIG. 1 presentment, section 36 is the right side section. Preferably the slopes of sections 34 and 36 are the same, although in alternate embodiments a different slope relationship is provided.

The upper portions (e.g., 10% longitudinal length to each respective side of the cross-section maximum peak line) of sloping surface sections 34 and 36 together define crown peak region 38 which is shown in this embodiment to be at the central region of elongation in cushioning device 20. In the FIG. 1 embodiment, the crown upper surface is coincident, in the widthwise direction, with longitudinally spaced horizontal lines such as central line 31. An alternate embodiment (not shown) features crown peak region 38 having a low-high-low height configuration in the widthwise direction (preferably as well with the shown longitudinal direction crown) which combination provides an overall "mound" or hill-shaped crown configuration. Further, alternate embodiments include, for example, a sinusoidal widthwise cross-sectional configuration as to provide a non-planar convex shaped curved or crown body support configuration in the widthwise direction to go along with the rise-drop configuration in the longitudinal or direction of elongation. Thus, the widthwise crowning, if provided, can be provided in singular fashion (e.g. a single mound like configuration with continuous height in the lateral direction) or multiple widthwise crown configurations (e.g., a double hump camel back configuration in the lateral direction). Thus, for example, with a two person Queen or King mattress, in addition to the longitudinal crown configuration in the intermediate or central area of elongation, there is further provided multiple (camel back like) crown regions going widthwise. Additional embodiments include providing one mound on one side of a mattress (e.g., King or Queen size) and one flatter adjacent side in the lateral (e.g., a "b" shaped configuration).

Additional embodiments of the disclosure include longitudinal multi-crown contouring as in providing spaced apart (e.g., a sinusoidal pattern in the direction of elongation) in that central area or end areas or combinations thereof, which can have different height presentations as in a maximum height or maximum amplitude crown in the central region of a mattress type cushioning device and, for example, a smaller height or amplitude crown in the head, feet or small back zone region (or any combination of the same amongst the noted zones). The providing of the longitudinal (as well as lateral crowning configuration, if present) is provided under embodiments of the disclosure with the below-described different projection/recess zoning height arrangements in the undersurface of a first layer 22, which height differential is then transmitted to the upper surface upon first and second layer securement. In alternate embodiments, foam (e.g., latex) or different material layers (e.g., non-wovens) can be placed above or below layer 22 with the upper surface of the combination having the transferred crown configuration.

With reference to FIG. 1, the crown peak region 38 is shown relative to a mattress as the cushioning device, with that mattress being in an uncompressed or non-user supporting state. In the mattress embodiment shown in FIG. 1, there is further featured "sock" covering 40 which is shown in cut away such that only a corner region of the mattress is shown covered. Fire socks are utilized in some mattress constructions as a fire barrier to facilitate having mattresses pass the U.S. Federal Register's 16CFR1633 Standard for the Flammability (Open Flame) of Mattresses or the like. Although sock 40 is shown cut away in the figure it is typically a somewhat elastic cloth material that fully wraps or encompasses the first and second foam layers 22 and 24 (and alternatively any other components of a mattress device that are layered or in a stacked relationship in association with layers 22 and 24) whereupon there is provided a mattress device suited for self use in a present state or implementation as, for example, a mattress core of a mattress with additional components (e.g., a mattress having additional material above or below as in a quilted tick layer supported by the upper surface 26 of first foam layer 22 or one or more additional layers above, in-between or below the illustrated first and second foam layers 22, 24).

With cushioning device 20 as a mattress device, the crown peak region 38 in the illustrated embodiment is shown positioned for at least some torso contact (e.g., buttocks, back and/or shoulder region), with embodiments including crown peak locations generally designed for back region contact for an adult user. As referenced above, alternate arrangements include providing a multiple crown-region configuration along the full longitudinal length of the cushioning device as in one or more non or less centralized locations (e.g., a crown region in a head region with or without a central crown region such as that shown).

Figure 6:
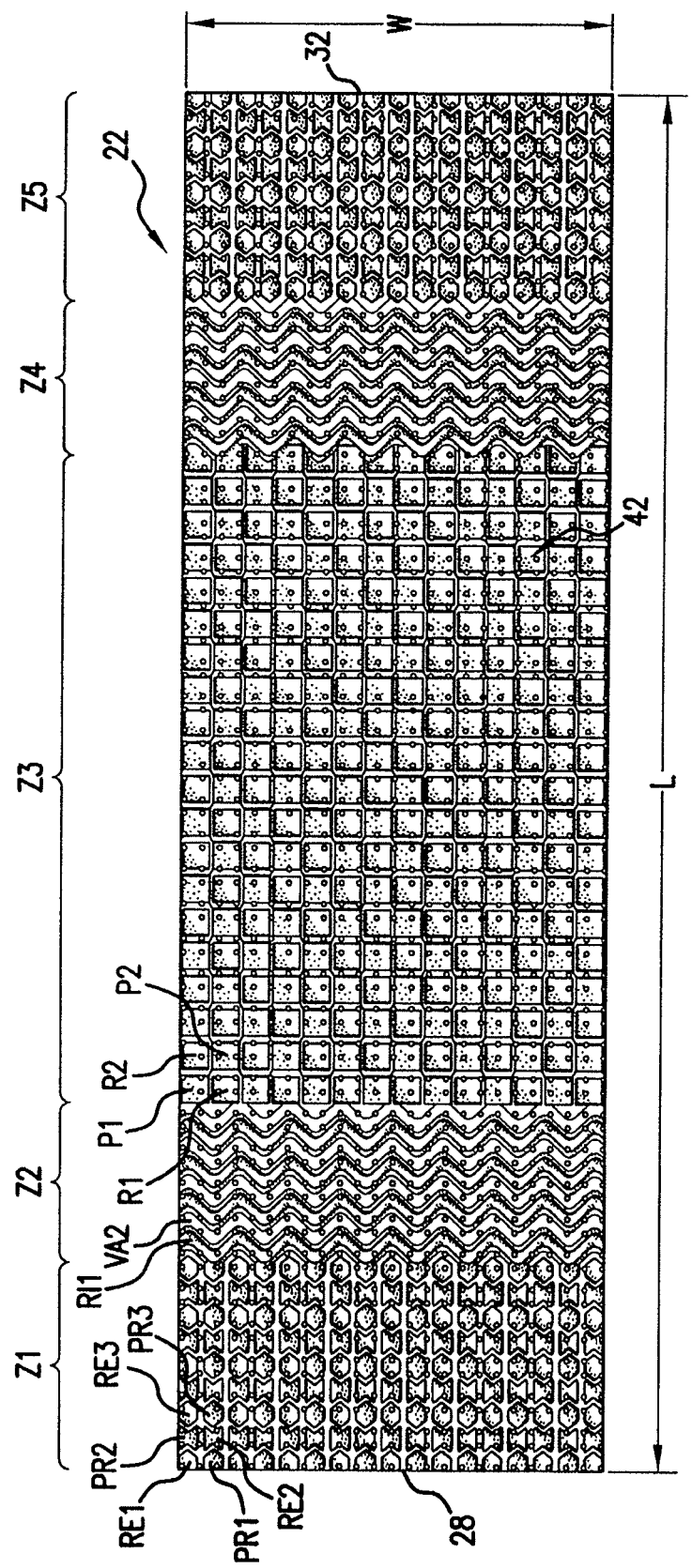
FIG. 6 shows a planar view of the upper or topper layer shown in FIG. 1 in a flipped over "display" state.

FIGS. 6 to 9 illustrate upper layer 22 in an independent and flipped over from normal usage position "display" state for facilitating a discussion as to the surface contour characteristics of contoured undersurface 42. Thus, FIG. 6 provides a plan view of first foam layer 22, but in a flipped over state relative to its normal convoluted or non-planar side down arrangement when used in cushioning device 20. As seen in FIG. 6, the second side (or under surface) 42 of first foam layer 22 has multiple zones Z1 to Z5, which is illustrative of an embodiment of the disclosure, although additional embodiments include first foam pads with less or more zones as in a range of 2 to 8 zones for a multi-zone embodiment and more preferably 3 to 7 zones (as in the illustrated 5 zone embodiment) as being illustrative of embodiments of the present disclosure. In embodiments comprising additional intermediate and/or superior and/or inferior or multi-base layer combinations, one or both surfaces can be contoured or, instead, planar. Also, while a projection surface or non-smooth overall surface on at least one side of the layer 22 is representative of an embodiment alternate embodiments include opposite layers of an overall smooth surface (with or without apertures) with a similar crown(s) forming cross-sectional profile.

The illustrated embodiment of layer 22 features different (configuration and height) zones along the longitudinal length with some of those different zones including common configuration and height zoning patterns at different locations along the longitudinal length of the cushioning device. As an example, the illustrated embodiment features the following pattern configurations representing one embodiment having common configured zoning regions: Z1=Z5 and Z2=Z4. The common configured zones are shown as being common both in pattern, height and longitudinal length although a deviation in relative longitudinal length and/or height and/or pattern configuration for "common" zones is also featured under the disclosure. Zone Z3 is shown longitudinally between zones Z2 and Z4 and is shown as being configured and positioned to provide at least some degree of torso support. In the illustrated embodiment, zone Z3 is of a greater longitudinal length than the other individual zones, and thus capable of covering a significant percentage of a user's torso (e.g., 70% to 100% of the torso of an average adult size user). Also zones Z1 and Z5 are shown as being generally positioned for feet and head support when the cushioning device is a mattress device like that illustrated. Also, the common configured zones Z2 and Z4 are shown as sandwiched between the central zone Z3 and a respective outermost zone of zones Z1 and Z5. Further zones Z2 and Z4 are shown as having the lowest value longitudinal length and in a position that is well suited for neck and upper shoulder contact for zone Z4 and leg (e.g., calf) contact for zone Z2 relative to a typical supported adult user.

Alternate embodiments include variations such as providing different patterns in more or less of the total number of zones (e.g., 5 to 7 zones each with a different pattern or any of the various possible sub-combinations amongst the number of zones provided). Also embodiments of the disclosure include a single, common pattern across the entire under surface 42 of layer 22, as in one with the different thickness zones along the longitudinal as to provide the above described crown configuration which crown configuration is preferably at least partly a result in the configuration of upper foam layer 22. Also, a single smooth surface can be provided in under surface 42 with the noted longitudinal thickness variations providing the above-noted crown or crowns. As seen below, however, the different zone patterns provides for convenient manufacturing processing under some embodiments with the transposed crown effect function occurring on securement of under surface to a more basic layer.

Also, in the illustrated embodiment the pattern in each zone is continuous across the lateral width of the first foam layer, although alternate embodiments include varying the pattern across the widthwise direction in one or more of the predesignated longitudinal length zones as, for example, providing a centralized first type of pattern configuration in a common longitudinal length zone and different left and right patterns relative to that more centralized (widthwise) pattern, or left and right different pattern zoning in the widthwise direction for some or all of the longitudinally spaced zones. Embodiment also include providing different projection heights in the widthwise direction which provides for alterations in widthwise crown configuration(s).

Cushioning devices can come in a variety of sizes under the present disclosure including, for example, lengths (L) and widths (W) that are suited for predetermined industry standard lengths and widths for the type of cushioning device involved. For instance, relative to mattress devices, upper foam layer 22 can be cut to the desired size as in a match for "standard" predetermined lengths and widths of conventional mattress or mattress topper sizes. For example, in the FIG. 1 embodiment of the disclosure, the upper layer 22 is provided with a corresponding length and width with second layer 24, although in alternate embodiments either one can be made of a different dimension as in the inclusion of foam rail pads around one or more of the upper layer's sides and/or ends with both the convoluted layer 22 and the associated border rail(s) being fully supported below by a larger dimensioned lower layer 24. In the illustrated embodiment, the upper foam layer 22 and the lower foam layer 24 each have a matching rectangular configuration (the L and W shown in FIG. 6 being applicable to both layers such that the ends and sides of each are coplanar) which in the illustrated embodiment can represent, for example, typical dimensions for a mattress. As an example, a length L of 72 inches (183 cm) and a width W of 34 inches (86 cm), which is well suited for supporting a typical adult(s) height and width. Further non-limiting examples can be seen in the width-length values for mattress products (A) to (H) as set forth below:

(A) Twin Size: 39" (99 cm)×75" (190 cm); (B) Twin Long (Twin XL): 39" (99 cm)×80" (203 cm); (C) Full Size: 54" (137 cm)×75" (190 cm); (D) Full Long (Full XL): 54" (137 cm)×80" (203 cm); (E) Three Quarter Size: 48" (122 cm)×75" (190 cm); (F) Queen Size: 60" (152 cm)× 80" (203 cm); (G) King Size: 76" (193 cm)×80" (203 cm) and (H) California King: 72" (183 cm)×84 (213 cm)"

With further reference to FIGS. 6 to 9, there is seen that the convoluted surface 42, representing the underside of layer 22, when in use, comprises a pattern Z1 (and hence Z5 for this common zoned embodiment) that features a plurality of different configuration projection/recess rows and columns. That is, in zone Z1 there is shown at the far end location represented by end edge 28, a lateral row of hexagonal projections and hexagonal recesses in a repeating pattern as in hexagonal recess RE1 and hexagonal projection PR1 in the outer end row; and, in an adjacent (in the longitudinal direction) row, there is presented a second lateral row with a sequence in the lateral direction of hour-glass shaped projection PR2 and hour-glass configured recess RE2 also in repeating sequence. As seen, in addition to the above noted lateral projection recess sequence there is also featured in the longitudinal direction a repeating sequence of lateral rows of hexagonal configuration and hour-glass configuration sets along the full longitudinal length of zone Z1. A variety of alternate pattern arrangements are also featured for zone Z1 under the present disclosure inclusive of some of the patterns described below for the different zones, although, as with the other zone patterns described below, the projection/recess configuration is well suited for providing the desired relative levels of zone support described for some embodiments herein.

In the adjacent longitudinal zone Z2 (and hence Z4 in this embodiment) there is a different configured projection/recess pattern which features a zig-zag or sinusoidal ridge/valley configuration for the projection and recess pattern. As seen there is a sequence of laterally continuous zig-zag shaped projections or ridges (such as ridge R11 in the first lateral row shown as having a smooth curved peak configuration in its sinusoidal wave pattern extending laterally) separated by correspondingly shaped valleys (such as valley VA2 in row 2), with that projection and valley sequence repeating for the full longitudinal length of the zone Z2. In the illustrated embodiments the peaks along the length of the ridge are shown smooth curved while the free end edge of each ridge projection is essentially flat topped in the illustrated embodiment.

Zone Z3 is illustrated in this embodiment as having a checkerboard pattern of projections and recesses (e.g., generally pyramidal in configuration projections with upper polygonal free end presentation surfaces as in square shaped free end presentment surfaces). Thus, there is a plurality of projections such as P1 in lateral row 1 and recesses as in R1 in row 1 adjacent to peak or projection P1; with the next adjacent row in the longitudinal direction featuring an outer recess R2 and an adjacent projection P2 in the lateral direction. The sequence of projection and recess repeats across each lateral row as well as in the longitudinal direction to provide peaks that are actually (or close to) being diagonally connected at the corner base region to adjacent peaks with recesses on all sides of that peak. This staggered arrangement thus forms the noted checkerboard pattern in the convoluted or non-planar underlying surface 42 of first foam layer 22.

As further seen by height value markers H1, H2 and H3 in FIGS. 7 and 8, each of the zones Z1, Z2 and Z3 (and in corresponding fashion Z3, Z4 and Z5) have a different level free end height in their respective projections relative to a common smooth opposite surface BS which, following cushioning device assembly and transmission of the height differences to the opposite foam layer side, is represented by the above described non-planar smooth surface 26. When layer 22 is in a detached and independent (pre-assembly) state, opposite surface BS is planar with the free ends of the peaks of the various zones falling at different heights relative to opposite surface BS. As explained in greater detail below, upon connecting (directly or indirectly) the first foam layer to the second foam layer, the difference in height along the longitudinal length of first foam layer 22 is transmitted from the underlying contoured surface 42 to the above noted upper surface 26 as to provide the non-planar crown configuration described above for cushion 22.

The heights of the longitudinally outer positioned end zones are preferably less than the internal zones and the height of the central zone is preferably greater than all other zones. For example, relative to overall thickness height in each of the zones Z1 to Z5, the following relationship is featured Z1<Z2<Z3>Z4>Z5. In illustrative embodiments, the maximum height represented by H3 for the upper pad is, for example, 1 to 5 inches (2.54 cm to 12.7 cm) with a step down in height of 7 to 20% of that maximum height at the ends; as in about a 15% drop in height in going from a crown peak to a minimum height portion of the upper pad (e.g., a drop down from a central maximum height H3 to lower height end as in H1 in pad 22).

As an example of an embodiment of the disclosure, there is featured a height H3 (between a free end maximum projection point for the preferably common height projections in zone Z3 to the opposite (solid) surface BS of layer 22) of 2.5 inches (6.35 cm), and a height H1 in the lowest height zone Z1 (and Z5) of 2.25 inches (5.71 cm) with the intermediate zones Z2 (and Z4) having a height H2 preferably at an intermediate height difference between the maximum and minimum heights in that layer (e.g., H2 equal to 2.375 inches (6.03 cm)).

This height differential provides a marked crowning configuration when the noted free ends of the projections (e.g., at least some of the projections in each of the respective zones Z1 to Z5) are secured to an underlayer, as in base layer 24; with direct adhesion being one way to implement that securement. In the illustrated embodiment, the interior (upper in use) surface 44 of the base layer 24, which the convoluted surface of the upper layer faces, is a smooth and planar foam layer surface, although alternate embodiments of the present disclosure include providing a contour in that surface as in one or more contour patterns either of a common presentment height or one or more different heights along the length or width (or both) of that presentment surface 44 of the lower layer 24. Also, while the illustrated embodiment features a smooth, non-planar upper surface 26 in the resultant product and a smooth, planar underlying support surface 46 in base layer 24, either or both of those surfaces can be contoured and/or of varying thickness (preferably in a manner that does not degrade the crown configuration in the upper layer 22, as in a configuration that is neutral or supplemental to the crown or crowns presentment). Patterns include, for example, essentially a mirror image zone patterns (e.g., following a single relative projection/recess longitudinal shift when using for example, a roller set convoluter such as that described below) as that provided on the opposite side or a different set of patterned zones.

Also, embodiments of the disclosure include the second layer having a maximum thickness greater than the maximum thickness of the first foam layer as in a ratio of 1.25 to 5:1 with a thickness ratio of about 2:1 being illustrative as in a maximum height thickness of about 2.5 inches (6.35 cm) in the upper layer and a thickness of about 5.5 inches (14.0 cm) in base layer 24.

Thus, as seen from the discussion above, an embodiment features a zoned convoluted topper foam region with "non-planar" cut surfaces, with the non-planar surfaces of the zones being producible by having the middle zone as a deeper convolute (thicker peak and thinner base) zone than the outer zones (e.g., an outer zone with a less thick peak and a relatively thicker base) giving a natural "crown" to the cushioning device (e.g., mattress). For example, as seen from the contoured topper pad 22 shown in FIG. 7, zone Z1 has a base height B1 and an above lying projection height of PR with the valley depth of the pattern in zone Z1 being the same as the projection height PR. An example is a base height B1 being 50 to 70% of the overall height H1 for zone Z1 (and Z5) and a projection height of PR being 30 to 50% of the overall height H1 for that zone (with the base height percentage for that zone being even less relative to the overall maximum crown height represented by H3). A non-limiting numerical illustration of an embodiment is one where height B1 is about 1.35 inches (3.43 cm) relative to an overall zone height H1 of 2.25 inches (5.71 cm) and projection height PR being is about 0.9 inch (2.29 cm) relative to an overall zone height H1 of 2.25 inches (5.71 cm) and thus for this embodiment the base height in the applicable zone is greater than the peak height with a ratio of 1.5/1 for this embodiment.

As further shown in FIGS. 7 and 8, zone Z2 (and Z4) has a base height B2 and an above lying projection height of PR' with the valley depth of the pattern in zone Z2 being the same as the projection height PR'. An example is a base height B2 being 40 to 60% of the overall height H2 for that zone and a projection height of PR' being 40 to 60% of the overall height H2 for that zone. A non-limiting numerical illustration of an embodiment is one where height B2 is about 1.19 inches (3.0 cm) relative to a height H2 of 2.375 inches (6.03 cm) and projection PR' being about 1.19 (3.0 cm) inches relative to a height H2 of 2.375 inches (6.03 cm) and thus for this embodiment the base height and peak height are equal within the applicable zone.

As further shown in FIG. 8, zone Z3 has a base height B3 and an above lying projection height of PR" with the valley depth of the pattern in zone Z3 being the same as the projection height PR". An example is a base height B3 being 25 to 45% of the overall height H3 for that zone and a projection height of PR" being 55 to 75% of the overall height H3 for that zone. A non-limiting numerical illustration of an embodiment is one where height B3 is about 0.83 inches (2.11 cm) relative to a height H3 of 2.5 inches (6.35 cm) and projection PR" is about 1.65 inches (4.19 cm) relative to a height H3 of 2.5 inches (6.35 cm) and thus for this embodiment the projection height is greater than the base height with a ratio of 2/1 for the applicable zone.

Thus, relative to the above-described 5 zone contoured surface pattern in layer 22, the base heights for the respective zones have a base height relationship as B1>B2>B3<B4<B5 (with B4=B2 and B5=B1) while the relative projection heights are PR<PR'<PR">PR4>PR5 (with PR=PR5 and PR'=PR4).

FIG. 8 provides a right end view of that which is shown in FIG. 7 and illustrates the relative step up in height in going from the end edge at the far right end (zone Z5) of the layer 22 to the central longitudinal peak height in zone Z3. FIG. 8 thus illustrates the relative smooth transitioned step up in height in going from $H_1$ to $H_2$ to $H_3$, respectively.

FIGS. 6 to 9 also feature an embodiment comprising perforations 48 that are preferably through holes that extend completely through the thickness of first layer 22 to open out at surfaces 26 and 42. Perforations 48 extend through the valley or recess areas between respective projections and/or through the projections in one or more (as in all possible sub-combinations and preferably all) of the respective zones as in Z1 to Z5. In the illustrated embodiment, the perforations 48 extend through, not only the recess regions between respective zones, but also through projections. Also perforations 38 are shown as being present in each of zones Z1 to Z5, although alternate embodiments include limiting perforations to any one or any sub-combination of zones Z1 to Z5 as well as coordinating the projection and through hole locations such that the through holes are limited to one or the other of zone recesses and zone projections rather than both as shown.

A repeating (spaced apart) pattern of holes across the entire surface is also featured in the illustrated embodiment. By having a repeating sequence hole pattern across the surface 26 like that shown there results in projections not only extending through both projections and recesses but, as seen from the illustrated embodiment, at different locations in the free end presentment surface in going from projection-to-projection in a common zone as well as in side walls of tapered projections.

Also, in the FIG. 1 embodiment of cushioning device 22, perforation providing is limited to the first (contoured) foam layer 22, with the base (non-contoured) layer 24 being a solid body or block of foam, although alternate embodiments include providing perforations in other layers of the cushioning device as in the base layer 24. The perforations 48 in upper layer 22 provide for an increased propensity for air flow through this top layer and the contouring provides for channeling radially away from the cushioning device. Perforations 48 also provide a softer feel for the topper foam that is a result of removal of foam via convolution as well as the perforation providing when compared to solid topper layer.

Embodiments of the disclosure also include having a higher relative "density" of holes in a particular zone relative to one or more other zones as to provide a softer area in that higher density holed region. Suitable perforation hole sizes include, for example, a 0.375 (0.95 cm)" diameter to 2" diameter (5.08 cm) (or similar area if non-circular perforation holes are utilized). Various perforation hole patterns (hole spacing, configuration, and hole size) within at least the upper layer 22 are also featured in the present disclosure.

Figure 10:
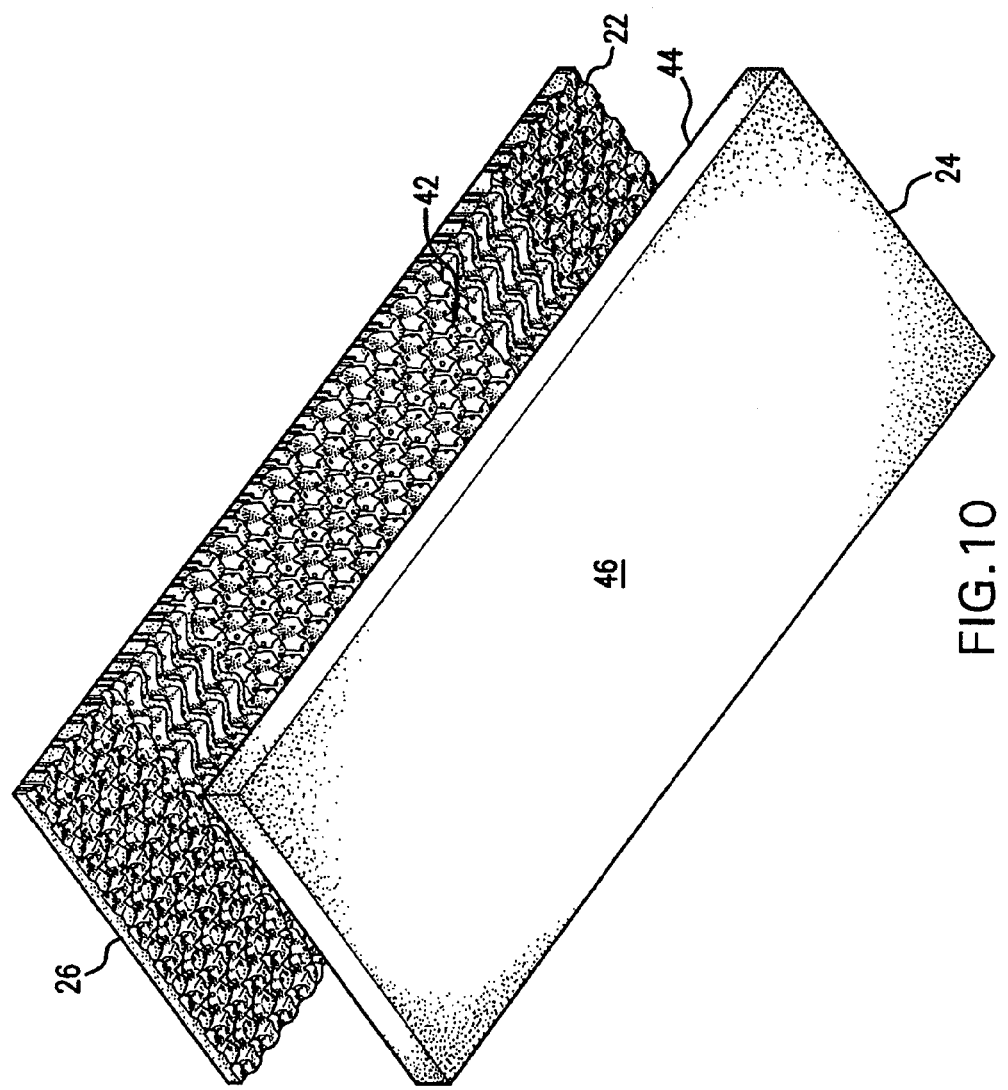
FIG. 10 shows the topper pad in FIG. 9 in the orientation assumed at the time of securement to an under or base layer to form an embodiment of the cushioning device of the present disclosure.

With reference to FIG. 10 there is seen upper layer 22 flipped over and in a pre-securement state relative to the underlying base layer 24. A preferred securement means is by way of an adhesion (e.g., a liquid (applied) adhesive or an intermediate adhesion layer as in a tacky layer of material that bonds the upper and lower layers in a desired stack configuration) or some form of fusing. Alternate securement means include, for example, overmolding of respective material, heat bonding with an intermediate melted and cooled layer, as well as fasteners such as hook and loop type (Velcro) fastener strips secured to the respective layers. In one example of securing layers 22 and 24 there is featured a process wherein a roll coat laminator is used to apply adhesive to the tips of the convoluted pad or layer 22 and the topper layer 22 is adhered to the core piece of foam 24 (or base layer). In an alternate embodiment, a suitable adhesive is provided in a pattern (e.g., a spray pattern corresponding to the peak projection pattern or in continuous layer form to the base layer 24 or contoured surface) and the upper layer 22 and base layer are brought into contact with that adhesive. In an embodiment example, the spray pattern is applied to the contoured layer 22 in a spray pattern that only covers the free end peak portions of some or all of the projections in one or more (e.g., all) of the zones and/or a spray pattern is applied only to the to be contacted regions of the contact surface which the projections contact.

First layer 22 can be of the same material as the second layer, although in preferred embodiments the first and second layers are of a different characteristic foam material (e.g., either a different type of foam or foams of different quality values with respect to same type foam material usage). For example, embodiments of the upper layer 22 include viscoelastic polyurethane (as in a viscoelastic material with a minimum 2.5 lb/ft$^3$ (40.0 Kg/m$^3$) density as in 2.5 to 6 pcf (40.0 to 96.1 Kg/m$^3$)), a polyurethane foam (as in a polyurethane with a 1.2 lb/ft$^3$ (19.2 Kg/m$^3$) minimum density as in 1.2 to 3.0 pcf (19.2 to 48.1 Kg/m$^3$)) as well as a high-resilience polyurethane (as in an "HR" polyurethane with a 1.8 lb/ft$^3$ minimum density as in 1.8 to 5.0 pcf (28.8 Kg/m$^3$ to 80.1 Kg/m$^3$)), and latex. The base layer 24 is preferably of a polyurethane (e.g., a high resilience polyurethane), or latex, or combinations of the noted foam materials.

Suitable foams for use under embodiments of the disclosure include, for example, one or more of foams a) to f), available from Carpenter Co. of Richmond, Va. in the United States, which include the following trade names:

a) Richfoam® (polyurethane foam)
b) Omaion® (a polyurethane foam with densification)
c) Qualux® (HR polyurethane foam as in that made with TDI)
d) Qualatex™ and Avena™ (HR polyurethane foam as in that made with MDI)
e) Avela™ (Viscoelastic polyurethane foam such as that made with MDI)
f) Isotonic® (Viscoelastic polyurethane foam such as that made with TDI)

The above-described foams a) to f) of Carpenter Co. are well suited for use as foam for a topper and/or intermediate foam layer in the application with a) to d) being well suited for use as a base layer foam. Also, foams suitable for use under the present disclosure further include latex foam as in latex with a density range: 2.0-6.0 lb/ft$^3$ (32.0 to 91.6 Kg/m$^3$); 25% IFD Range: 5-40 lbs (2.27 to 18.1 Kg) per ASTM D1055 (which is an industry testing standard for Latex foam which is slightly different than the ASTM D3574 which is used for polyurethane foam). Thickness ranges for latex use for the individual layers can be the same as for polyurethane in topper, intermediate, and core or base layers. Also, core or base layer urethane foams Density/IFD ranges 1.5-4.0 lb/ft$^3$ (24 to 64 Kg/m$^3$); 20-50 lb (9.1 to 22.7 Kg) IFD (and for HR polyurethane 1.8-5.0 lb/ft$^3$ (28.8-80.1 Kg/m$^3$); 15-50 lb (6.8 to 22.7 Kgs) IFD) are illustrative of embodiments of the disclosure.

Thus, embodiments of the disclosure include values for 25% IFD of upper layer 22 in a range from 5 lbs to 40 lbs (2.27 to 18.1 Kg); as well as values for 25% IFD of base layer 24 in a range from 15 lbs to 45 lbs (6.8 to 20.4 Kg) (both per ASTM D3574, Test $B_1$), with the 25% IFD value for the base layer preferably higher than that of the topper layer.

Figure 19:
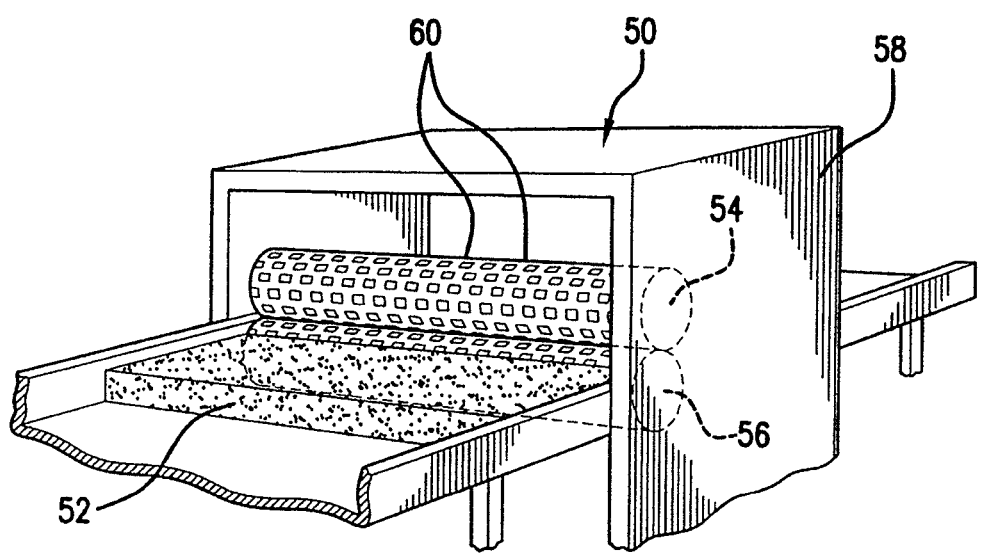
FIG. 19 shows a feed side perspective view of a prior art roller convolutor assembly.
Figure 20:
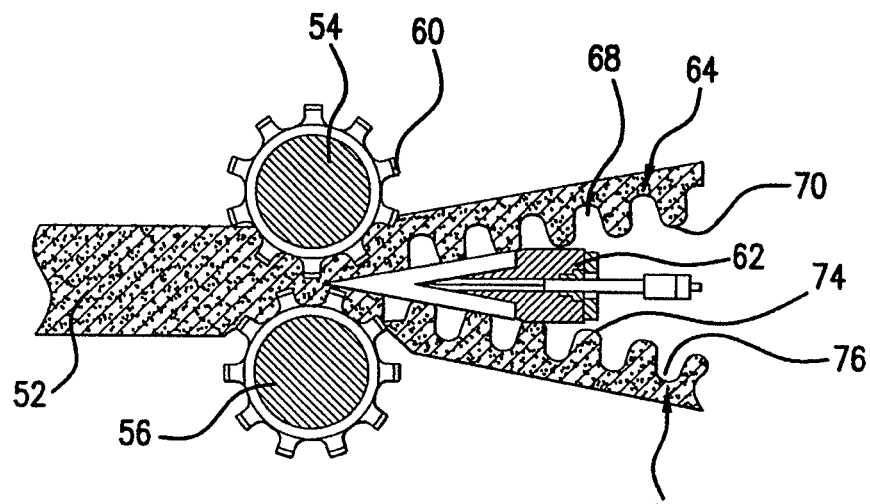
FIG. 20 shows a schematic cross sectional view of a pad undergoing convolution cutting in the assembly of FIG. 19.
Figure 21:
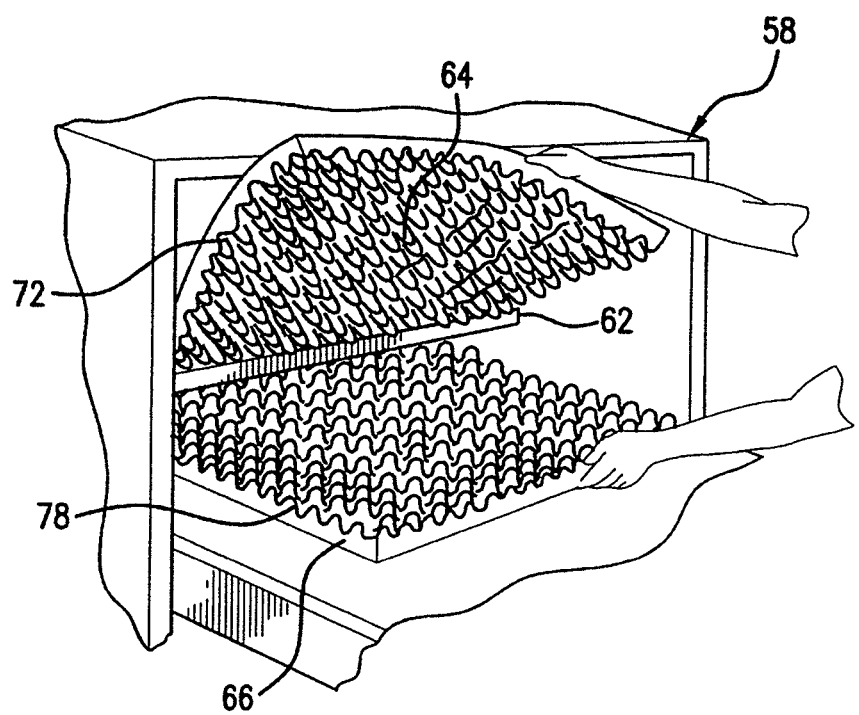
FIG. 21 shows an output side of the convoluter assembly of FIG. 19.

A variety of surface contouring methods can be used to form the non-planar, preferably multi-zoned configured pattern and/or different thickness surface 42 in first layer 22. For example, a convoluter assembly or a contouring assembly as in a CNC saw cutting (known as contour cutting) is utilized in providing a contoured surface 42 in first layer 22. An example of a convolution type contouring assembly is shown in the prior art system shown in FIGS. 19 to 21. FIG. 19 shows a conventional convoluter assembly 50 with material slab 52 being fed between compression rollers 54 and 56 supported by support assembly 58 and with each having (relatively offset) fingers 60. FIGS. 20 and 21 show slab 52 being deformed by the respective profile fingers of rollers 54 and 56 and then cut by knife device 62 while being in a state of compression which results in output layers 64 and 66. Output layer 64 is shown as having a plurality of valleys 68 and bulbous peaks 70 across its newly exposed, profiled surface 72, which valleys and peaks correspond in opposing, opposite fashion with respective peaks 74b and valleys 76b on newly exposed, profiled surface 78 of opposite output layer 66 in an essentially mirror image relationship.

Convoluter assembly 50 shown in FIGS. 19 to 21 is illustrative of a conventional profile cutting machine (convoluter) such as sold by Fecken-Kirfel GmbH, of Aachen, Germany. As described in the literature associated with such convoluters, typical materials described for use with such profilers include synthetic and natural rubber (e.g., combined granulated rubber), foams such as polyurethane, polyethylene, open cellular polyvinylchloride flexible foam, latex, and other foam types (including virgin, bonded, and integrated material foam products as in melamine filled polyurethane foam) and other compressible materials. These materials are also suitable for use in the manufacturing process and cushioning device of the present disclosure discussed herein.

Also, with reference to FIG. 20 and the peak 70 and recess 68 formation in the upper output layer 64 and the peak 74 and recess 76 formation of output layer 66, in the FIG. 20 embodiment there is a centralized knife with common dimensioned tooling projections that form common size peaks and a common thickness base layer in each of output layers 64 and 66. The present disclosure includes an embodiment wherein two or more layers are formed from a common slab of starting material (e.g., like slab 52). Also, an embodiment of the disclosure includes subjecting the slab of starting material with a projection/valley tool set with the projections and valleys of that tool set being configured to form different height peak sets in multiple longitudinally spaced zones. These different height peak sets are formed in an embodiment by forming certain areas with deeper depth valleys (thinner base layer) which results in higher corresponding peak heights.

In other words, the peak height increases, while the depression base height decreases. The amount of peak height equals the amount of decrease of the depression base height for that same foam area The sum of the adjacent overall peak heights and depression base heights remain constant relative to a common planar reference base despite differences in overall thickness from zone to zone. An example of such a relationship is seen in FIG. 13A wherein the cutting pattern in a starting slab of material is illustrated. As seen, the various zones H1, H2 and H3 are formed by having different overall peak heights with adjacent base heights. Thus, there is provided a relationship of B1>B2>B3 for the base levels in the different zones in the overall peak heights for the different zones of PK1<PK2<PK3. Also, it can be said for an arrangement such as shown in FIG. 13A the following relationship holds generally true [B1+PK1]=[B2+PK2]=[B3+PK3]

Figure 12:
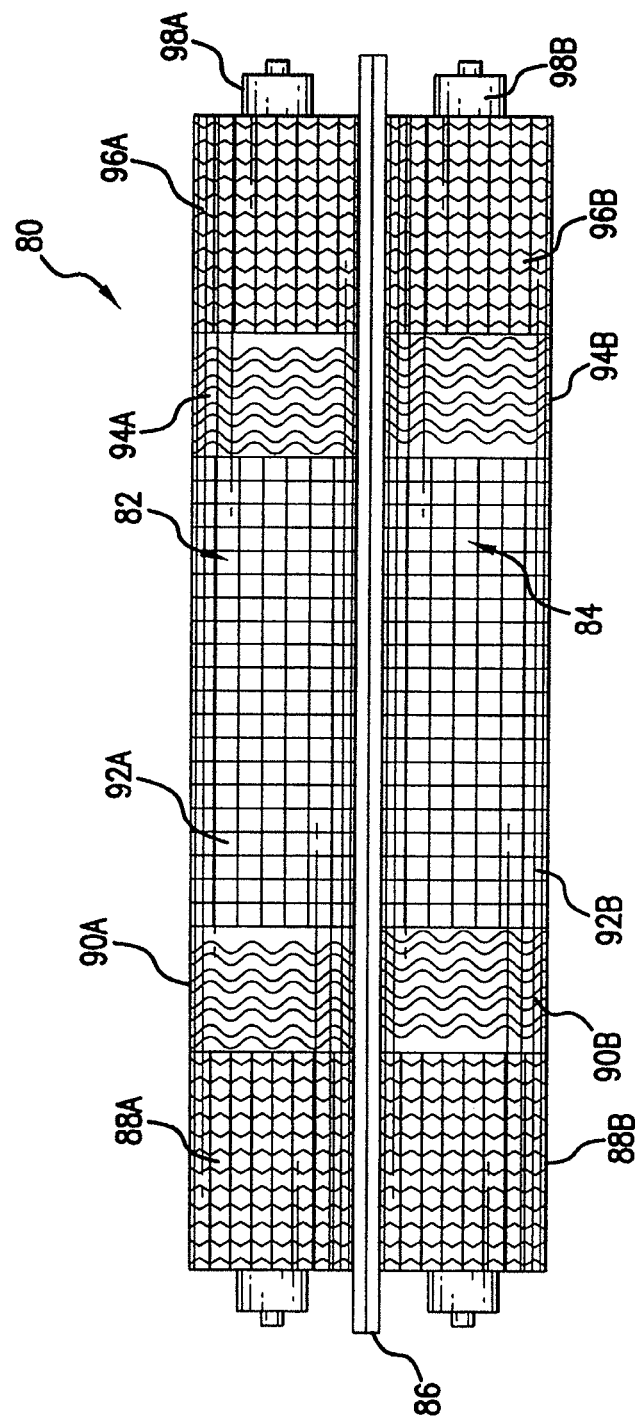
FIG. 12 shows a tooling assembly for use in convoluting a foam pad to provide a convoluted pad like that shown in FIG. 6 (as in one of two mirror image pieces).

While a variety of different tooling set ups can be utilized to provide different thickness heights amongst a plurality of zones, an embodiment suitable for use under the present disclosure is seen in a contouring assembly like that of FIG. 19 but with tooling assembly 80 featured in FIG. 12.

Figure 13:
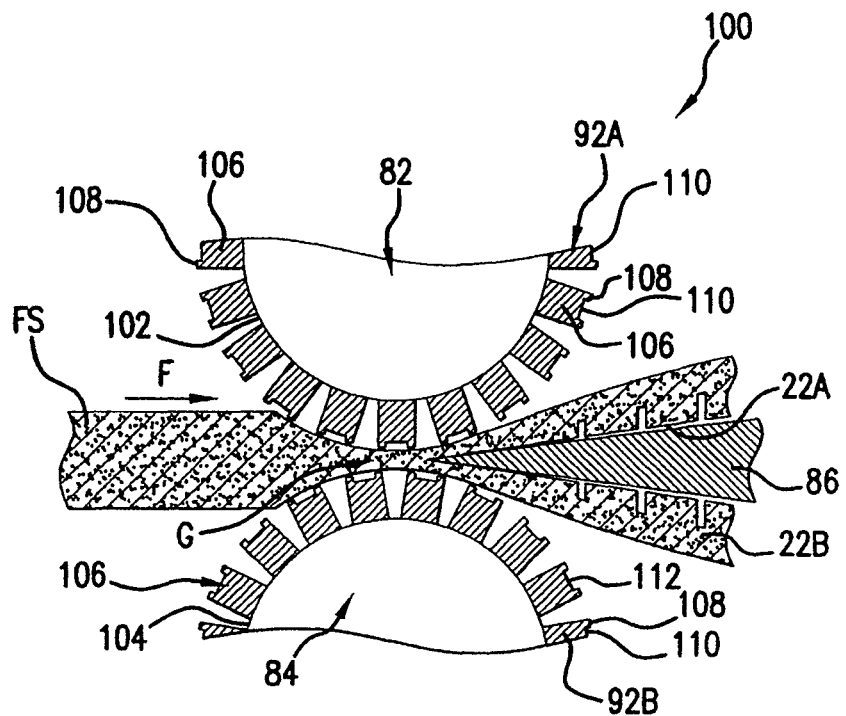
FIG. 13 shows a schematic cross-sectional view depiction of a pair of compression rollers having an offset tooling projection pattern, and with a monolithic slab of foam material being drawn through a gap between the rollers of a tooling set (such as that of FIG. 12), compressed and cut.
Figure 13A:
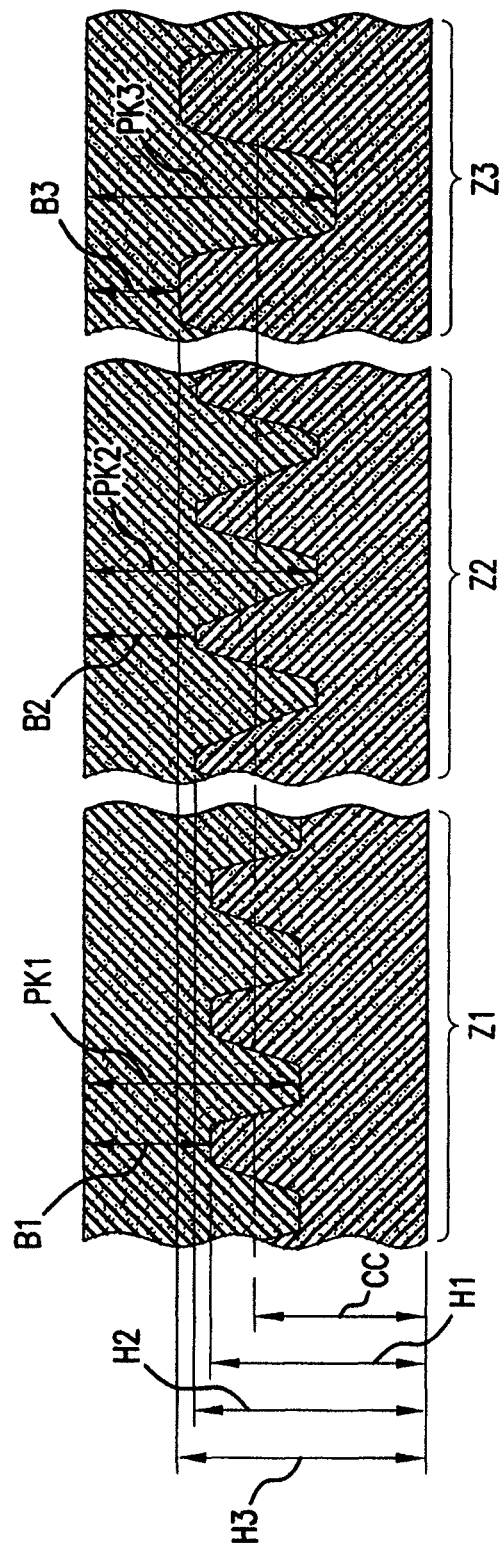
FIG. 13A shows a schematic depiction of the tooling cut pattern generated by the tooling set in the cut/compression area represented in FIG. 13 (as well as an illustration of a mashed, restacked pair of the output products of FIG. 13).

Tooling assembly 80 in FIG. 12 includes a pair of tooling devices as in tooling rollers 82 and 84 that are designed to draw in the material feed slab FS as shown in FIG. 13 and produce two mirror image output products 22A, 22B each having generally the same five zone configuration shown in FIG. 6 for upper layer 22. In other words, under an embodiment of the present disclosure, the output products 22A, 22B are each generally representative of the upper layer 22 shown in FIG. 6 and each output product can be secured to two independent base layers 24 to form two similar cushioning device 20 embodiments like that shown in FIG. 1.

Also, with the illustrated design in contoured upper layer 22 shown in FIG. 6 featuring a symmetric, common respective end and second to end zones, the output products 22A, 22B can be secured with either end at the forward end of base layer 24 with the same general resultant cushioning device 20 produced. This avoids having the assembler (automated or manual) having to ensure a specific end of layer 22 is aligned with a specific end of layer 24 during assembly if, for example, the base is other than a solid-block planar surfaced block of foam. As described above, however, alternate embodiments do include forming the output products 22A, 22B such that one is not generally the same in height(s) as the other (e.g., different blade height positions) or forming different zoned, patterns (which may require closer attention when assembled to ensure a desired end of upper layer is aligned with a desired end of the base layer).

The formation of the different zoned tooling areas in surface 42 of upper layer 22 is achieved in one embodiment with tooling assembly 80 comprised of tooling rollers 82 and 84 and intermediate positioned blade assembly 86. Each of tooling rollers 82 and 84 is shown as being comprised of a plurality of different profile rings with the same outer diameter that are combined to produce output products with different zones next to each other (e.g., a multi-zone mattress pad).

Exemplary embodiments for tooling devices 82, 84 (e.g., tooling rollers) include a unitary (e.g., monolithic) tool device that extends over generally the full contact width of the compressible material or, as a further example, tooling that is comprised of a plurality of tool units as in a plurality of cylindrical sleeves or plates or "profile rings" or the like. For example, tooling of the present disclosure includes tool devices (e.g., profile rings) that are stacked on a central rotation shaft (such as the noted shaft 98A (or 98B) shown in FIG. 12 to achieve the desired width such as the widths for forming relatively wide bodies as in mattress bodies or lesser width bodies as in seat cushions and the like). The tooling means of the present disclosure features a variety of additional embodiments in addition to those described above, such as tooling assemblies featuring any combination or subcombination of the tooling means described above as well as tooling means represented by the examples A) and D) set forth below. Also, a general discussion of stacked tooling rings is provided in German Utility Model 20014598.3 to Carpenter Co. which is incorporated herein by reference.

A) conveyor-conveyor combinations (including, for example, smooth (e.g., recessed or non-recessed) to patterned combinations as well as patterned to patterned combinations—opposite and offset patterned meshing tooling on adjacent conveyor devices);

B) conveyor-tooling cylindrical roller combinations (including, for example, smooth to patterned and patterned to patterned combinations with the smooth being either of the conveyor and roller components and the patterned also being one or the other or both); and C) sliding or stationary plate-cylindrical tooling roller (or conveyor) combinations, etc.

D) independent tooling sheets as in non-circular flexible tooling sheets fed between compressive roller devices.

Also, while a centralized, generally mirror-image separation of an input slab is well suited for many embodiments of the disclosure, adjustments (pre-cutting or during cutting) in the relative location of the cutting blade or separation means is also featured under the present disclosure as well as the inclusion of added cutting means as in two blades operating to form three output products with the same or different relative thicknesses. Further, through adjustment of the relative location of a blade to a tool device (e.g., through operation of a blade height adjustment means found in conventional profilers or contouring devices) there can be achieved the placement of the cutting plane in close proximity to one of the tool devices such that an extraction process is carried out whereby one of the two output products may constitute a waste or separate use layer and the remaining output product represents a surfaced output product body. Such blade adjustments can include an intermediate generally common split thickness range of 40-60% relative to the spacing distance at the point of maximum compression or less than 10% with the blade positioned close to an actual blade/tool device contact providing extraction settings.

Tooling device 80 is shown in FIG. 12 as comprising a plurality of tooling profile rings 88A, 90A, 92A, 94A and 96A for the upper tooling roller 82 and profile rings 88B, 90B, 92B, 94B and 96B for the lower roller 84. While each profile ring is shown as being of an axial length equivalent to a zone's longitudinal length, multiple similarly configured profile rings are provided for a common zone (e.g., a plurality of profile rings which, when summed, combine together to form zone Z3) in an alternate suitable embodiment. Alternately, a profile ring can have different zone patterns as in a hybrid profile ring.

In one embodiment there is a provided a first stack of profile rings as an upper shaft 98A and a second stack of profile rings on lower rotation shaft 98B, which have circumferentially spaced projection/recesses that are in an offset relationship to provide for a projection of one profile rings tooling to correspond with a recessed area in an opposing profile ring of the opposing roller. In the illustrated embodiment the profile rings are in the form of a cylindrical, annular body with central cavity through which rotation shaft (e.g., see shafts 98A, 98B in FIG. 12) is inserted (e.g., a key slot/spline arrangement to rotationally interlock) although other locking means as in bolts and the like are featured as mounting means in alternate embodiments. The illustrated embodiment shows a tooling device that is rotatably supported for contact with compressible material fed thereto.

In one embodiment of the disclosure, the patterned convoluter tooling assembly 80 in FIG. 12 has a tooling projection and recess configuration like that outlined in PCT Patent Application No. PCT/US10/25219, filed Feb. 24, 2010, of the Carpenter Co. (PCT '219), which application is incorporated by reference. As described in PCT '219 there is provided tooling devices that feature projections in one tooling device that are designed, relative to a corresponding cavity of an opposite tooling device, to form non-bulbous or essentially flat top or flat rimmed projections. The flat top or flat rimmed projections are formed by projections in the tooling device that each have an encompassing rim configuration that extends around a respective projection recess floor (e.g., a multi-sided rim configuration). As examples of multi-sided rim configurations, there is provided a rim configuration that includes a square rim configuration with a square shaped projection recess floor, straight and curved rim wall rim sections as in an hourglass and hexagonal rim configuration.

Further embodiments described under PCT '219 include opposite side rim walls forming a channel shaped and an exposed projection recess floor between the opposite side rim walls. An example of such an embodiment includes one that features a base body that has a continuous outer profile with curvature and with pairs of respective rim walls defining the channel shaped with exposed projection recesses or channels spaced along the width of the tool device. These channels preferably extend continuously about the continuous outer profile of the base body, with, for example, the opposite rim walls extending in a parallel wavy pattern about the tooling base body and with adjacent projections being spaced apart along a width of the base body to a greater extent than a width of one of the channels defined by adjacent, opposite rim walls.

The above described application illustrates one technique for forming a contoured surface 42 such as that shown in FIG. 6 featuring a plurality of zones having projections extending out to a free end surface that are at different height levels, with the above-noted PCT '219 providing non-bulbous or "flat-top" (e.g., flat rim with concave interior) individual projections that are adhered in the illustrated embodiment to an opposing face of an adjacent foam in a method such as those described herein.

While a more detailed discussion of means for forming the above described non-bulbous or flat-top projection zones can be found in PCT '219, provided below is some additional discussion to illustrate one of multiple techniques for forming multiple zones of projection/recess patterns with those zones having projections extending to a different height as to provide means for forming a crown configuration in an upper surface of an upper layer adjoined to an upper surface of a lower layer of material via shape transmission from what was on the undersurface of the upper layer to the upper surface of the upper layer.

In this regard, reference is made to FIG. 13 which illustrates, in schematic fashion, convoluter assembly 100 which is similar to the conventional system 50 of FIG. 19 but has the tooling assembly 80 featured in FIG. 12. Tooling devices 92A and 92B of the tooling pair are mounted in stacked fashion to achieve the desired width (e.g., a width generally commensurate with the average length or width of a desired output product as in, for example, a cushion layer in the form of a mattress layer or mattress topper). For instance, the tooling devices 92A and 92B can include tooling devices with each of sufficient axial length as to enable the formation of a cushion or similar device of a length that conforms to the typical height range for a standard mattress size. Typical adult height lengths that are often associated, for example, with one of the various standard mattress sizes such as those described earlier includes 70 to 84 inches (177.8 to 213.4 cm).

FIG. 13 shows the pair of tooling devices 92A and 92B rotating in opposite directions as in a counterclockwise rotation in upper roller 92A and a clockwise rotation in the lower roller 92B to achieve the left to right feed direction F in foam slab FS. The input slab FS is also shown in these figures as being a monolithic body as in a solid foam input pad, with alternate "in-feed" slab embodiments including an integrated (e.g., adhered) collection of foam particles (e.g., ground up waste foam adhered together as a common slab body) as well as additional illustrative embodiments that include laminated arrangements or simply stacked layers of similar or different material types (e.g., slab embodiments being of different materials as in a foam/non-woven stack of material (that are joined together in some fashion as in heat bonding, adhesion, material integration, etc.) or similar or different materials placed in a non-joined stack as in a stacked set of different grade foam layers).

FIG. 13 further shows a view of compressed material being fed though reception gap G with the slab of material FS (solid block of foam shown) being subjected to a compression state with the maximum state being in the region generally represented by a compression location where the relative outermost circumferences of rollers 92A and 92B are at their closest relative spacing. As further seen, at this location, the offset tooling relationship for the illustrated embodiment, places a tooling cavity 102 defined at its base by exposed tooling body surface 104 of one tooling device (92A, 92B) in general alignment with the projection 106 of an opposite tooling device (92B, 92A) with FIG. 13 showing a relative rotation state wherein upper tooling device 92A features the projection 106 along the center line and the lower tooling device 92B features the foam material cavity 102.

In an exemplary embodiment, tooling rollers 90A and 90B are rotated generally at a common rotation speed and are set apart such that the respective outer circumferences are spaced apart a spacing distance that is less than the input thickness of slab FS. The relative spacing distance is preferably set to achieve the desired level of compression relative to the slab material type and thickness and with the desire to achieve sufficient feed traction without excessive strain on the system due to too high a compression level imposed. Thus, the slab being fed through the reception gap G is cut by the cutting means 86 such that when a projection of a lower roller causes the compressible material to be pressed up into a concave portion of the above positioned tooling device 92A there results the formation of a cavity in the lower output product and a corresponding foam protrusion in the upper output product. In contrast, when the roller is oriented such that a projection of an upper positioned roller aligns with a lower positioned concavity in the lower roller and is cut while generally in that state, there is formed a resultant cavity in the upper output product layer and a projection in the lower output product layer upon a rebounding of the elastic material outside of the reception gap G.

Further, the relative spacing is preferably made adjustable by suitable adjustment capability in the profiler roller support structure (e.g., see support structure 58 shown in FIG. 19). For example, while not meant to be limiting, compressible material thickness range of 30-250 mm (1.2-9.8 inches) is illustrative. Also, while depending on the material being compressed, the spacing range is designed to be suited for efficient (e.g., see feed through and strain discussion above) handling of slabs of foam (e.g., a polyurethane foam such as a viscoelastic foam or a latex foam, as but a few examples). In addition, the location of the cutting edge of blade 86 is preferably made adjustable relative to the height between the outer circumferences of the tooling devices 92A and 92B (e.g., a middle height position provides for generally equal thickness output products or the cutting edge can be shifted up or down to render non-equal overall thickness output products including potentially thin waste layers (e.g., an extraction situation) generated when the cutting edge is moved to a maximum up or down state relative to the circumferential tooling device exterior). In addition to the noted cutting edge height adjustment (or alternative to), the cutting edge is made adjustable along a horizontal plane such that the cutting edge is placed either upstream, at, or downstream of a vertical central line extending through the respective axes of rotation for the rollers, with the FIG. 13 embodiment being shown positioned just downstream of the center line while the elastic material represented by slab FS is shown as still in a high state of compression and the cutting edge of the blade in assembly 86 (e.g. a moving band saw blade) is generally within reception gap G.

Figure 14:
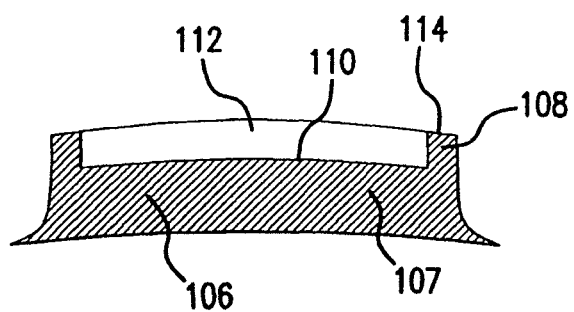
FIG. 14 shows a cut-away view of one of the projections (e.g., posts) with interior, intermediate height step down (relative to a higher outer rim and a lower supporting base) of the central projection region or zone in the tooling set embodiment shown in FIG. 13.

FIG. 14 shows a cut-away view of one of the projections (e.g., posts) 106 of the profile ring 92A (or 92B). The cross-sectional view of one of the posts in zone Z3 that is shown in FIG. 14 is directed in similar fashion as the radial cross-section depiction of the post shown in FIG. 13 although for this generally "square" profiled projection, an axially directed cross-section will have a similar presentment configuration as shown in FIG. 13. Also, the illustrated embodiments show a monolithic projection having a projection base body 107 and a projection rim 108 (square shaped in this embodiment) at the upper end of the projection base body and extending about the periphery of that base body 107 as to define a square rim projection extension for projection 106.

Also, body portion 107 has an exposed interior floor surface 110 which represent a step down projection recess floor for that projection that is surrounded by the interior vertically extending surface of rim 108. The step down projection recess floor 110 and interior bordering surface of rim 108 define a material receiving cavity 112 (preferably a generally fully filled material receiving cavity upon sufficient compression relative to the material being convoluted) at the upper extremity of projection 42A. Rim surface 114 also represents in the embodiment illustrated a material first contact surface for post 106.

Figure 15:
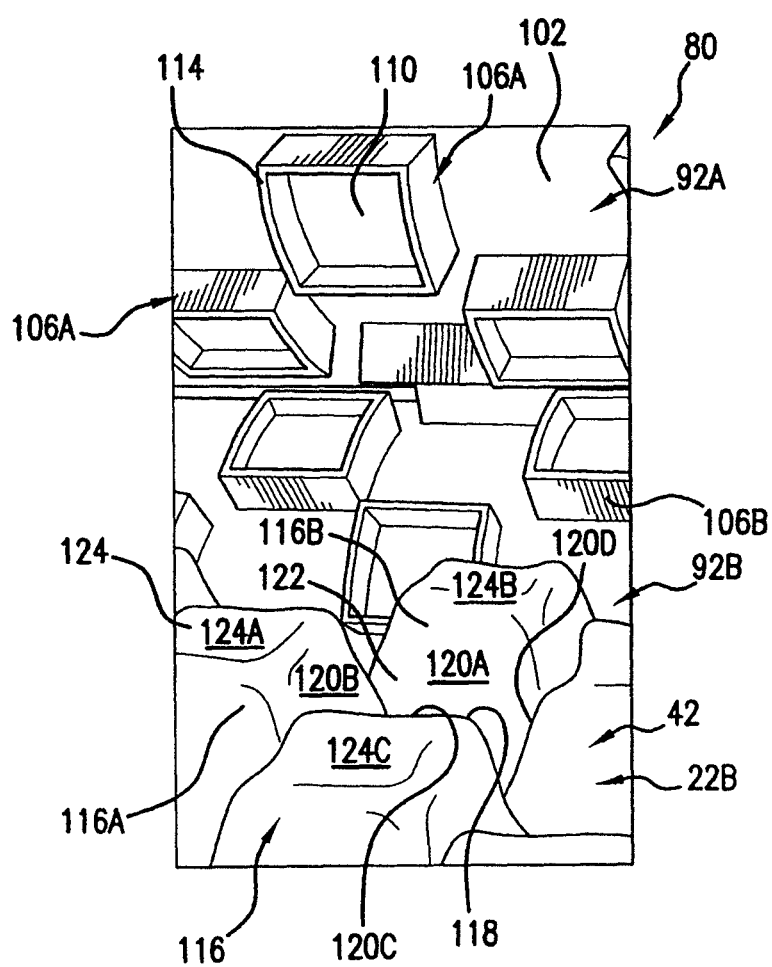
FIG. 15 shows a partial view of the central projection pattern region of the pair of counter rotating compression rollers shown in FIG. 12 as well as a surface pattern of a section of one of the essentially mirror image foam material output products featuring a checkerboard like "square" foam projection/recess configuration.

FIG. 15 shows a partial view of tooling device assembly 80 shown in the illustrated form of a compression roller set (e.g., an upper compression roller 92A and a lower positioned compression roller 92B) as well as a section of the exposed surface 42 of output product 22B (e.g., a section of one of two (or more) output products generated by the tooling set of rollers following cutting or splitting with FIG. 15 showing only the lower positioned output product for better viewing thereof). In the FIG. 15 embodiment there is shown the zone Z3 pattern of the overall contoured surface 42 in first foam layer 22. Thus, following passage of the input foam slab FS, relative to the tooling sections 92A and 92B of those rollers, a "square flat top" plurality of projections represent the pattern 116 that is generated in each of the intermediate portions of the output products 22A, 22B to provide the Z3 contour (with preferably a similar "mirror image" pattern being generated in the corresponding mirror image output product, which is not shown for improved viewing of the exposed surface of the lower output product 22B (the lower of two in the illustrated embodiment with the upper one removed from view)).

FIG. 15 further illustrates projections such as 106A with the above described projected square shaped contact rim surface 114 and exposed, internalized step down projection surface 110 in tooling 92A. As also seen in FIG. 15, output product 22B, which is, for example, a foam body, as in a viscoelastic polyurethane foam body, has pad body protuberances 116 partially defining a portion of the exposed surface 42 of output product 22B (e.g., a portion of the convoluted surface in the foam pad layer 22). Further representing the exposed surface 42 are base valley surfaces 118 (the surface extending between the base of adjacent protuberances), which together with the exposed side walls 120A to 120D of protuberances 116, define the recesses or valleys 122 formed between sets of protuberances Protuberances 116 (e.g., 116A, 116B, 116C . . . etc.) which generally, or to some extent, represent a reciprocal configuration as to that presented by the tooling—as in tooling recesses corresponding to output product protuberances in the area such as those shown as having a generally flat upper protuberance surface 124 (e.g., an adhesive contact surface). Also, for the illustrated embodiment of FIG. 15, each of flat upper protuberance surfaces 124A, 124B, 124C, etc. are shown as individually having generally a non-bulbous presentation surface or generally flat top free end projection surface within the noted free end projection portion for each projection. There is, in the illustrated embodiment, the formation in each of the protuberances free end area some degree of concave general depression area between a minor rim region extending about the free end periphery in each foam projection or protuberance. This concavity is, in the embodiment shown, relatively minor and thus qualifies the projection as one having an essentially flat top projection which is in an embodiment, a surface that contacts the facing surface of base 24 or an intermediate layer inclusive of a secure contact as by adhesive.

Figure 16:
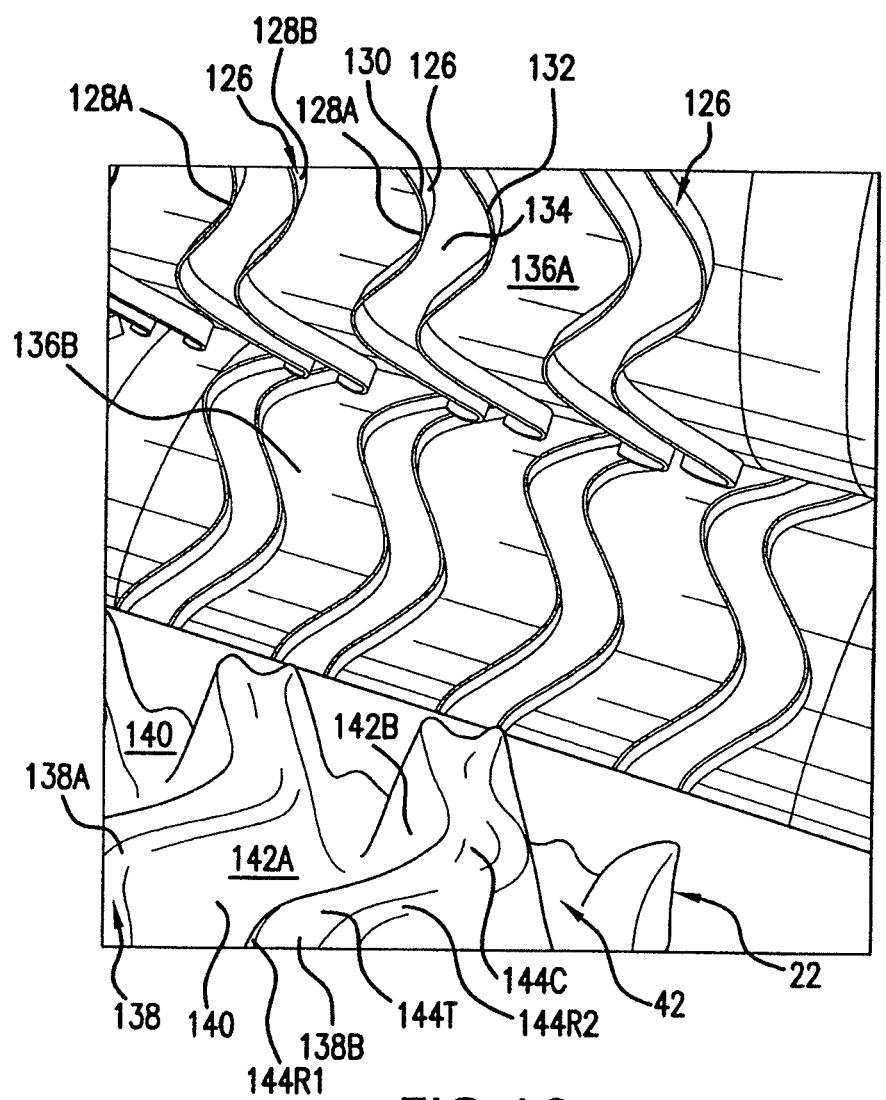
FIG. 16 shows a view of the wavy pattern tooling portion of the tooling set shown in FIG. 12 and a resultant wavy projection-recess section of one of the essentially mirror image output foam products.

FIG. 16 shows an enlarged view of the tooling zones 90A and 90B in tooling rollers 82 and 84 (which due to the illustrated symmetry is generally in common with tooling zones 94A and 94B (e.g., viscoelastic). In this enlarged view there can be seen projections 126 with opposing rim walls 128A and 128B, as well as the exposed upper rim edges 130 and 132 together with projection recess floor 134 (which together define projection recess channel 134C). Shown in FIG. 16 is an illustration of a portion of the tooling assembly 80 featuring an upper tooling device (tooling roller) 82 and a lower positioned (second) tooling device 84 (tooling roller) between which is formed reception gap G. Relative to each other, the opposing tooling rollers 82 and 84 are arranged to have, at least in the intermediate areas, a central circumferential line for each projection 126 of one tooling device aligned with a central circumferential line of an opposing valley recess 136A (136B).

As also seen in FIG. 16, output product 22B (of a mirror image set of two with only the one shown), which is, for example, a foam body as in a polyurethane foam body, has pad body protuberances 138 (e.g., 138A, 138B, ...) partially defining a portion of the exposed "wavy patterned" surface 42 of output product 22B. Further representing the exposed surface 42 are valley surfaces 140, which together with the exposed side walls 142A to 142B of protuberances 138, define the recesses or valleys 132 formed between a pair of side-by-side protuberances Protuberances 138 which generally or to some extent represent a reciprocal configuration as to that presented by the tooling—as in tooling recesses 136B forming in the upper roller forming a protuberance like protuberance 138B. Thus, as an example of this relationship, a projection width of, for example, 0.75 inch (1.9 cm) (with thin rim walls and the channel recess therebetween, will generally produce a 0.75 (1.9 cm) inch thick foam protrusion at its top, or free end exposed surface).

Also, for the illustrated embodiment of FIG. 16, each of the wavy pattern projections is shown as having a non-bulbous and generally flat projection free end. For example, the uppermost free end surface 144T for each of projections 138 is shown as being generally flat with small height rims 144R1 and 144R2 with some concavity therebetween as presented by concave bridging surface 144C extending between the ridges 144R1 and 144R2. Thus, tooling zone set 90A and 90B (and correspondingly tooling zone set 94A and 94B) provide for a contoured surface configuration of a wavy pattern that can be of a different thickness level than the other tooling zones based on the tooling configuration for the respective zones.

Figure 17:
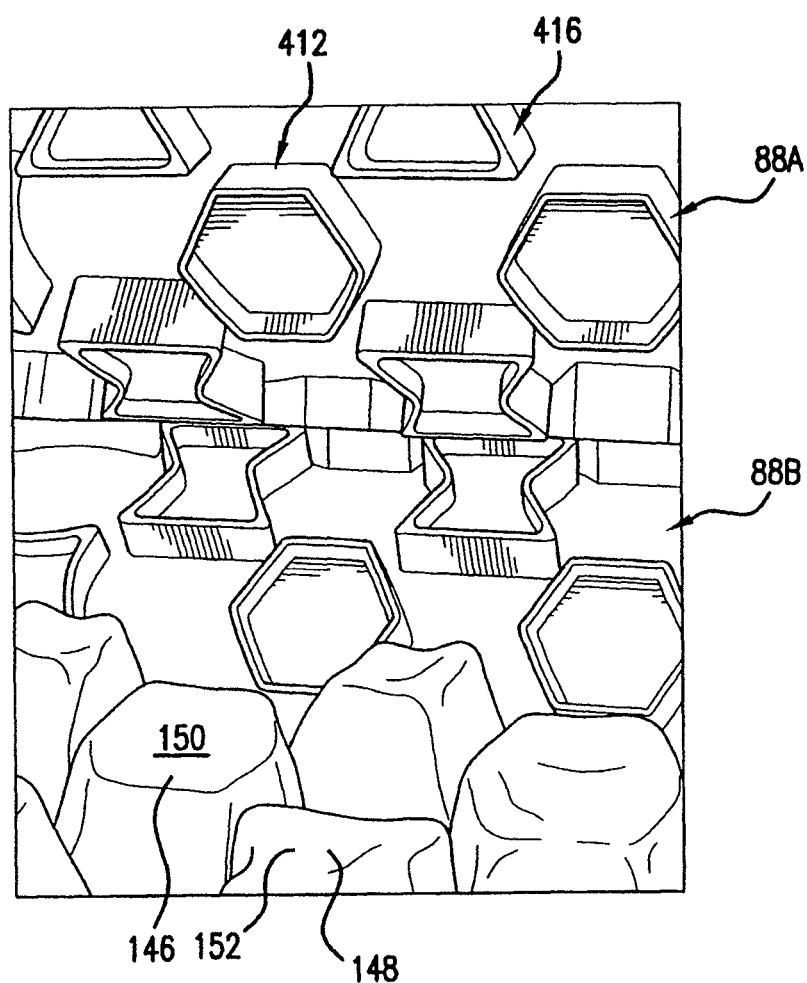
FIG. 17 shows a view of the hexagonal/hourglass pattern tooling portion of the tooling set shown in FIG. 12 and a resultant hexagonal/hourglass projection-recess section of one of the essentially mirror image output foam products.

As seen from FIG. 17, the end tooling zones (88A and 88B on the left and 96A and 96B on the right) for tooling assembly 80 feature hexagonal shaped projections 412 and hour-glass projections 416 in adjacent rows (as well as opposing hexagonal recesses to receive hexagonal hourglass projections and hour-glass recesses to receive hour-glass projections). As with the "square flat top" projections described above, both the hourglass and hexagonal projections feature outer peripheral rims with an intermediate height, interior to rim step down surface which is above the base of the profile ring. The contour cutting then results in the zone Z1 (and Z5) surface pattern in contour surface 42 of layer 22. As further seen in FIG. 17, the tooling zones 88A and 88B result in an output product 42 having both hexagonal and hourglass flat top protrusion sets (146, 148) with the hourglass shaped protrusions 148 shown being dispersed and positioned adjacent to hexagonal shaped protrusions 146 with both of the hexagonal and hourglass shaped protrusions (146, 148) presenting generally flat exposed uppermost surface 150 and 152 in the projections, respectively (having similar flat top characteristics as in, for example, a slight concavity in the uppermost protrusion surface as that described above for the square free end projections).

Figure 18:
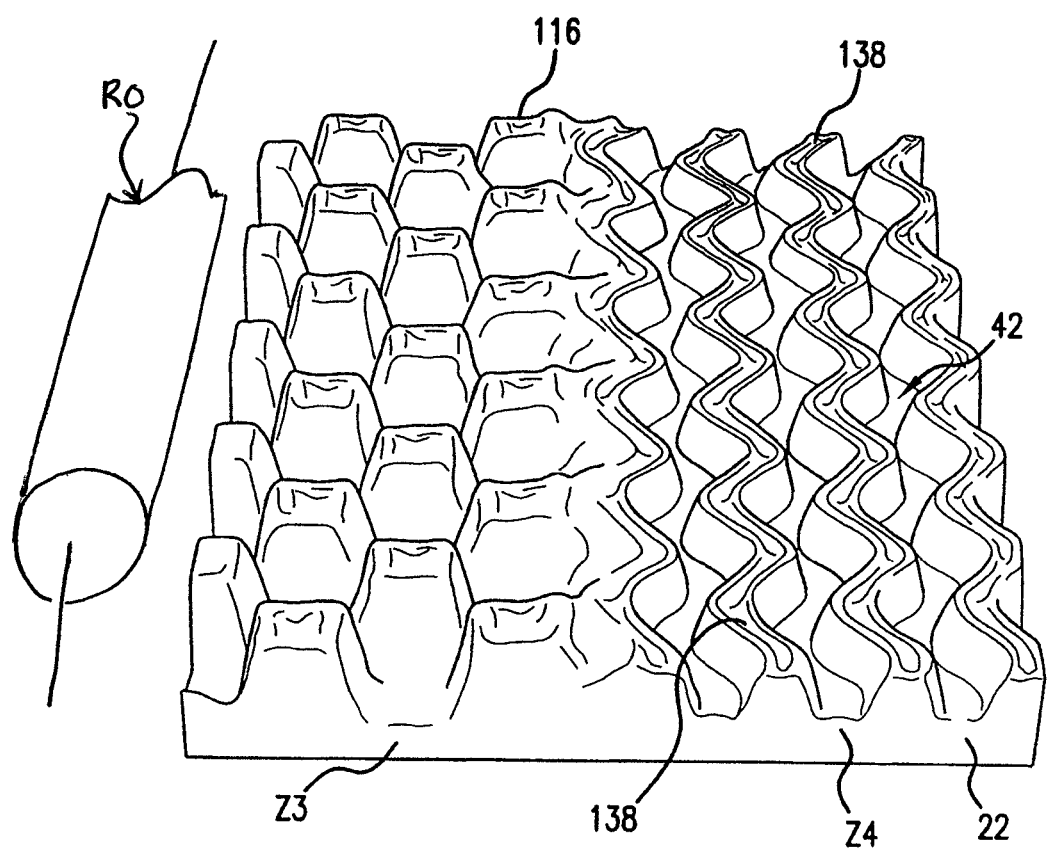
FIG. 18 shows, in cut-away, a section of a resultant output foam product featuring the wavy pattern and square projection checkerboard regions and the interface region therebetween.

FIG. 18 provides a more detailed view of the interface region between the intermediate zone Z3 and the adjacent wavy pattern zone Z4 and the corresponding projections 116 (square top projection) and 138 (sinusoidal wavy ridge projection). Also, in the illustrated FIG. 18 embodiment there is not featured perforation holes 48 as featured in the earlier embodiment which is illustrative of a process wherein the contouring is done first and then the perforation (if to be included) as opposed to alternate embodiments of the disclosure wherein a perforation step is carried out prior to a surface contouring step or an embodiment wherein there is a simultaneous step as in a pin based molding technique wherein individual contoured and perforated layers are formed in one common step. Additional embodiments include cushioning devices which are free of ventilation holes or ones where the upper layer 22 is non-perforated while a lower in use layer such as base layer 24 is perforated.

Figure 2:
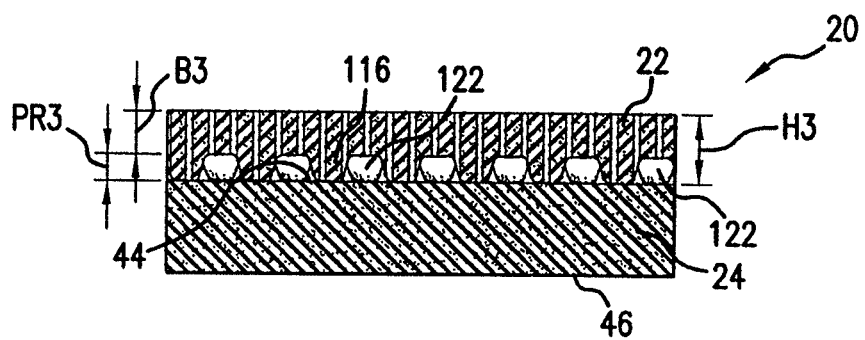
FIG. 2 shows a cross-sectional view taken along cross-section line II-II in FIG. 1.

FIG. 2 shows a cross-sectional view of cushioning device 20 taken along cross-section line II-II of FIG. 1. As seen for this embodiment, the free end of the projections in zone Z3 (e.g., the non-bulbous, square periphery projections 116 shown in FIG. 15) are shown in this embodiment to be directly secured (e.g., an adhesive attachment) to the planar upper surface 44 of base layer 24. At the central longitudinal location represented by widthwise line 31, the crown peak region 38 is at its maximum height and corresponds with maximum thickness H3 in layer 22. FIG. 2 also shows the pyramid shaped projections 116 and adjacent recesses 122 generally positioned to both sides (lateral direction) and both ends (longitudinal) of each projection 116. FIG. 2 also shows a recess 122 that opens out to a free side edge of cushioning device 20 (right side in the cross-section shown in FIG. 2). FIG. 2 also shows the base height B3 and peak extension height PR" representing the distance projections 116 extend out from that base platform.

Figure 3:
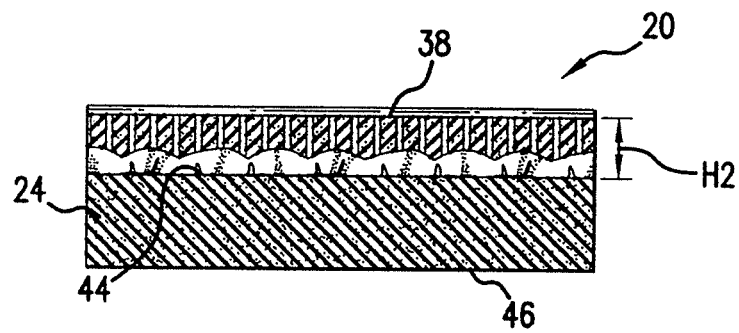
FIG. 3 shows a cross-sectional view taken along cross-sectional line III-III in FIG. 1.

FIG. 3 shows a cross sectional view of cushioning device 20 taken at an intermediate (longitudinal direction) location positioned between the widthwise central line 31 and end 32 of the cushioning device (e.g., at the longitudinal center of wavy pattern zone Z4) and shown as having thickness height H2 in FIG. 3. As shown, the non-bulbous free ends of the wavy pattern projections 138 (FIG. 16) in zone Z4 are also directly secured (e.g., by an adhesive) in this embodiment to surface 44 of base layer 24. As further shown, the valleys 140 between the wavy pattern projections are retained upon the securement of the upper layer 22 to base layer 24. Also, the projection height of the square topped projections 116 in intermediate zone Z3 are of a greater height than the wavy rib projection height in zone Z4. Thus, since the free ends of the different height projections 116 and 138 are secured to a common horizontal platform represented by surface 44 in FIGS. 2 and 3, the difference in height in the respective zones is transferred up to the upper surface 26 for cushioning device 20 resulting in the non-planar crown configuration described above. This crown configuration can be seen in FIG. 3 by the sloped down surface that originates from the center line 31 and in this Figure is shown as extending down to the cross-section line which is inclusive of crown peak region 38.

Figure 4:
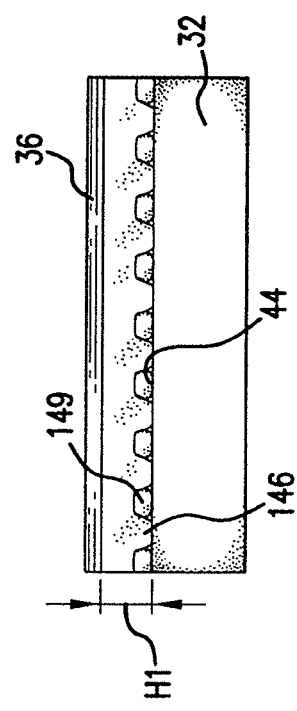
FIG. 4 shows an end elevational view showing the right end of that which is shown in FIG. 1.

FIG. 4 represents a (non-cross-sectioned) end view of the end 32 of cushioning device 20 having the lowest thickness height H1 in FIG. 3. As shown, the non-bulbous free ends of the hexagonal projections 146 (or adjacent hour-glass projections 148 depending on the end length chosen for upper layer 22) in zone Z5 are also directly secured (e.g., by an adhesive) in this embodiment to surface 44 of base layer 24. As further shown, the valleys 149 between the projections in zone Z5 are retained upon the securement of the upper layer 22 to base layer 24. Also, the projection height of the wavy rib projection height in zone Z4 is greater than the projection height of the projections in zone Z5. Thus, since the free ends of the different height projections 138 and 146 (and 148) are secured to a common horizontal platform represented by surface 44 in FIGS. 2, 3 and 4, the difference in height in the respective zones is transferred up to the upper surface 26 for cushioning device 20 resulting in the non-planar crown configuration described above. This crown configuration can be in FIG. 3 by the sloped down surface 36 that originates from the center line 31 and extends all the way to the end 32.

Alternate embodiments of cushioning device 20 include a laminate combination of layers of material provided above a base support of material. This includes, for example, additional layers of foam or alternate material (e.g., a non-woven fiber layer) material positioned above or below (in use) contoured layer 22. For example, a multi-layered laminate of two visco foams is featured in an alternate embodiment (which laminate is comprised of the same grade or different grades of visco foam) for upper layer 22. In one embodiment this is accomplished by gluing the zoned, contoured undersurface viscoelastic foam to another flat viscoelastic foam piece. This glued laminate can then optionally be perforated in a downstream process step or alternatively, if perforation is desired, it can be done prior to contouring the one or more layers to be supported on the base support and then the perforated layer or layers laminated. In an alternate embodiment there is an upper layer of contoured undersurface viscoelastic foam, an intermediate layer of latex and a lower base layer of a polyurethane foam such as those described above as being well suited for the core or base layer 24.

Figure 11:
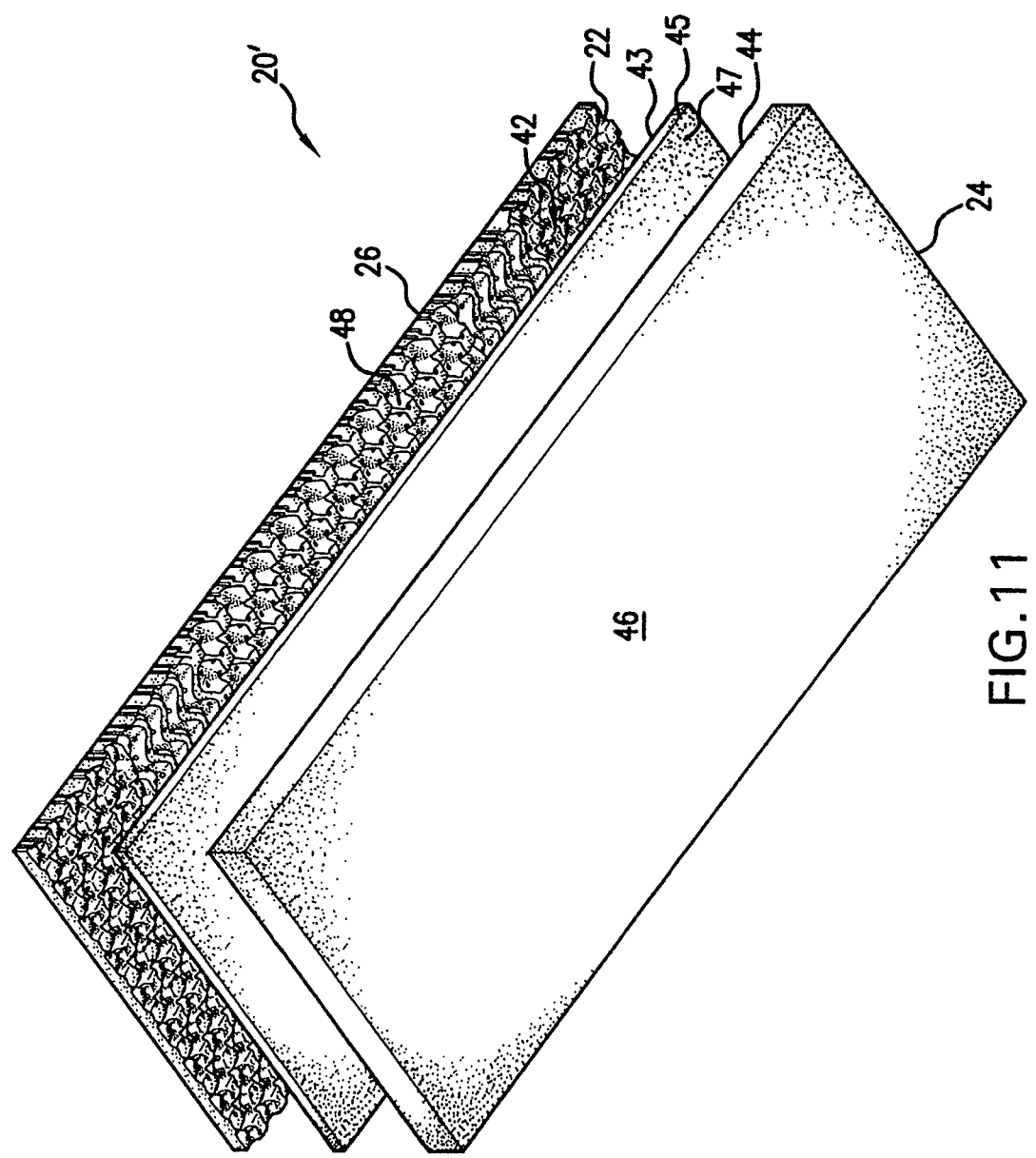
FIG. 11 shows a view similar to FIG. 10 but with an intermediate layer interposed between an above positioned pad and a below positioned pad.

In this regard, reference is made to FIG. 11 showing an alternate embodiment or cushioning device 20' comprises of first, upper layer 22 which is shown having its contoured undersurface 42 facing an upper surface 43 of intermediate layer 45 in a pre-attachment state. Intermediate layer 45 is further shown as having undersurface 47 which is facing upper surface 44 of base layer 24. Upon assembly (e.g., a direct adhesion of the surfaces of the respective layers shown in a pre-stack state in FIG. 11) there is provided alternate embodiment cushioning device 20'. In one embodiment, intermediate layer 45 is formed of a foam material as in a viscoelastic material or of a latex such as that described above. This includes, for example, having first layer 22 of a first type or grade of viscoelastic material and intermediate layer 45 of a second type or grade of viscoelastic material or of a latex material or another polyurethane foam or vice versa. This includes having upper layer 22 formed of a higher density viscoelastic layer material and intermediate layer 45 of a lower density viscoelastic layer material or of a latex. Also, while layer 24 is referenced as a "base layer" it need not be the lowermost layer in use such as the inclusion of one or more additional underlying layers (with base layer 24 also inclusive of a laminate layer itself with or without additional underlying layers).

Embodiments for cushioning device 20' include having the intermediate layer or a common thickness or of less thickness than upper layer 22 and with the base layer being of greater thickness than each respective above positioned layers 22 and 45 (including embodiments where the sum of the first and intermediate layers is at or less than the thickness of base layer 24). As an example of alternate embodiments, cushioning device 20' includes one having intermediate layer 45 of a greater thickness than upper layer 22 and of less thickness than base layer (the sum of the above positioned layers being less than or equal or greater than the thickness of base layer 24).

Also, in the illustrated cushioning device 20' only the upper layer 22 is shown as having ventilation apertures in the form of through-holes 48, although alternate embodiments include providing intermediate layer with ventilation apertures as in apertures that are aligned with those provided in upper layer (e.g., as by a common perforation step). An additional embodiment includes providing ventilation apertures such as commonly aligned apertures through each of the layers in cushioning device 20' (as well as cushioning device 20).

Figure 9:
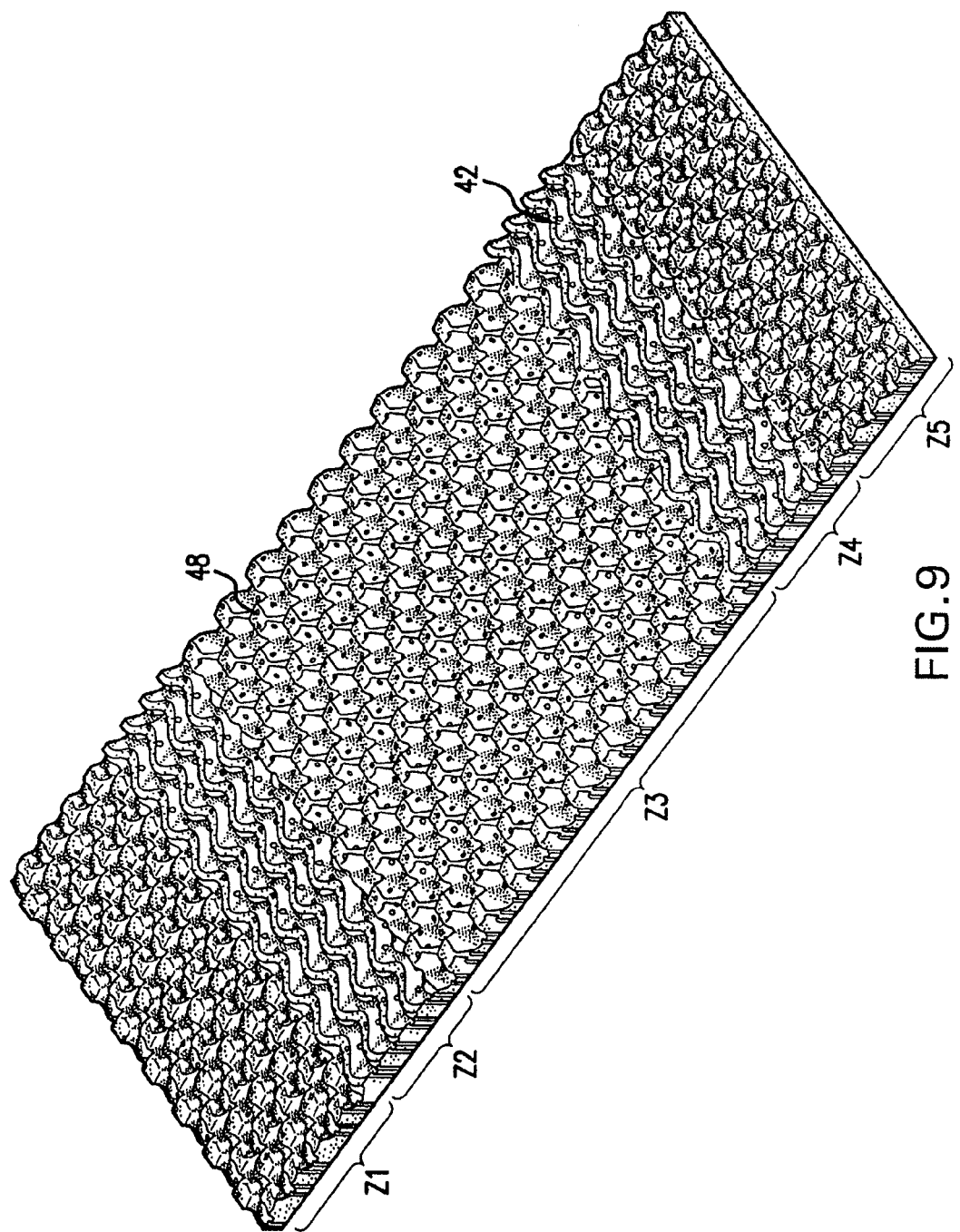
FIG. 9 shows a perspective view of that which is shown in FIG. 6.

FIGS. 1, 7 and 9 further illustrate that contoured first layer 22 with ventilation means 48 (which in the illustrated embodiment is provided by vent holes such as that seen from FIG. 7), are preferably through-holes extending though the entire thickness of the ventilated first layer 22 (as shown in the preferred embodiment) and preferably opening out at the respective top and bottom (in use) surfaces 26 and 42 of first layer 22. The orientation of the vent holes 48 in first layer 22 is preferably vertical. An embodiment features "true" or "completely" vertical axis flow channels either of a common horizontal cross-section configuration over the vertical thickness of first layer 22 (e.g., a common diameter cylindrical recess extending through the top layer) or one that varies as in a stepped (sharp edge or smooth transition) shoulder arrangement (not shown) or a more continuous sloped arrangement as in the slightly conical configuration of holes as with one having a larger opening size at the upper surface 26 and a smaller opening size at the end opening out at surface 42 as to provide, for example, a conical configuration.

FIG. 7 provides an illustration of contoured first layer 22 by itself and illustrates an embodiment with common size holes 48 with FIG. 1 illustrating a hole pattern extending over essentially the entire upper surface 26 (and also essentially over the lower surface 42 of contoured first layer 22). The ratio of solid versus open recess can vary depending on, for example, the material used and whether or not there are multi-zones of different characteristics. The ratio of solid relative to non-solid across the surface region represented by L×W for upper layer is 30 to 80% with 40 to 70% being illustrative for an embodiment formed by a convolution process as described below and with 60-90% and more preferably 40-90% with hole sizes of 0.375" (0.95 cm) diameter to 2" (5.08 cm) diameter with, for example, a punch press operation of the type described below.

Embodiments of the disclosure thus include, for example, perforation hole sizes of from 0.375" to 2" (0.95 cm to 5.08 cm) or more preferably, 0.375" to 1.25" (0.95 cm to 3.2 cm) diameter. Various hole patterns (spacing and hole size) within a topper are further featured under embodiments of the disclosure.

An embodiment of the disclosure includes holes that are of a common size hole and provided over essentially the entire surface (across zones Z1 to Z5) as illustrated in FIG. 1 (e.g., the hole pattern extends out from an intermediate region to all peripheral siding locations as in the four sides shown with the preferred common spacing between rows of holes being consistent in both the latitude and longitude out to the edging region).

Base layer 24 is preferably a body which provides support (e.g., a support means) to the upper layer 22 shown as a breathable upper layer 22. Base layer 24 is in an embodiment of the disclosure is thicker than upper layer 22 as in base layer 24 having a thickness of about 1.5 to 4 times that of the ventilation layer as in from 4 inches to 12 inches (10.1 to 30.5 cm), with about 5.5 inches (14 cm) being suited for an exemplary embodiment. Also, in an exemplary embodiment, preferably almost the entire surface area (e.g., 80% or more) of the support base 24 is covered by upper layer 22, with a preferred embodiment having at least one common side edge relationship as in opposite side edges sharing a common edge location with one or more edges of upper layer 22. An embodiment for base layer 24 is a non-perforated, solid foam layer (contoured or non-contoured) that is preferably of a different material type than first layer 22.

While base layer 24 is, in exemplary embodiments, a solid, non-perforated body (e.g., a solid foam body) variations are also featured under the present disclosure as in making base layer 24 sectional and of different characteristics, adding venting ports that also work with the one or more above positioned layers or recesses for receiving other components as in foam block inserts, inflatable inserts, mechanical devices as in fan units, firmness altering inserts as in wood strips and the like or softening inserts, etc. The present disclosure also features a base layer with a convoluted surface and/or recess for receiving the above noted additional components as in board or fluid packet inserts. Further, upper layer can be formed of independent multiple zones that are joined together to form a longitudinally extending support cushion surface as in securing respective zones to a continuous underlying base support layer (adhesive layer bonding). The same is true for the upper layer 22 in that rather than the continuous, monolithic layer shown a plurality of independent sub-sections can be formed to provide the crown effect described above and secured to the base layer (and optimally to each other along common edges).

Also, while the presence of a ventilated top layer is preferred due to its close proximity to the main heat source, (the user), the present disclosure also features an embodiment where reliance is placed on heat convection and conduction brought about by having no ventilated layer (e.g., just a height and/or projection pattern zone sequence in layer 22), a ventilated underlying layer, or an intermediate breathable or air flow ventilation layer with a solid or non-perforated top layer.

The perforation means 48 for the contoured first layer 22 can be formed in a variety of ways such as die-cutting, molding, drilling, cutting (e.g., coring blades), melt removal, chemical deposition, extraction, convolution, or other techniques that can function to form vent holes in the material being relied upon as the ventilated layer. For example, embodiments include the formation of the ventilation means 48 through a technique featuring compression tooling with cutting (e.g., a convolution/extraction type process) or a die punch technique with punch pin based tooling have shown to provide a suitable perforation process.

As to the former, reference is made to U.S. Pat. No. 4,603,445 to Spann which describes techniques for forming voids extending entirely through a foam pad which is incorporated by reference. U.S. patent application Ser. No. 12/402,140 to Carpenter Co., which was filed on Mar. 11, 2009, also describes an alternate die punch technique for forming through-holes in a foam layer, which application is also incorporated by reference.

As seen from FIGS. 1, 7 and 9, for example, a feature of embodiments of the present disclosure is that the perforations 48 extend not only in the valley regions between projections in one or more of the zones Z1 to Z5 (as in all 5 zones as illustrated) but also through projections in those one or more zones (as in all 5 zones having projections with ventilation holes) as shown. Under embodiments of the disclosure, this perforation through the projections results in through-holes extending through different regions of the same type of projections in a common projection zone (inclusive of partial perforation column walls as in perforation channels that open out on projection tapered side walls into an adjacent valley region with the partial perforation column shown in the right side view of FIG. 1 being illustrative of such partial perforation column configurations). Also, embodiments of the disclosure include perforations which open out at tapered side walls of the projections as illustrated by the underside view of the perforated top layer in FIG. 9 (which would involve some degree of partial column configuration when true vertical perforations are utilized).

Figure 22:
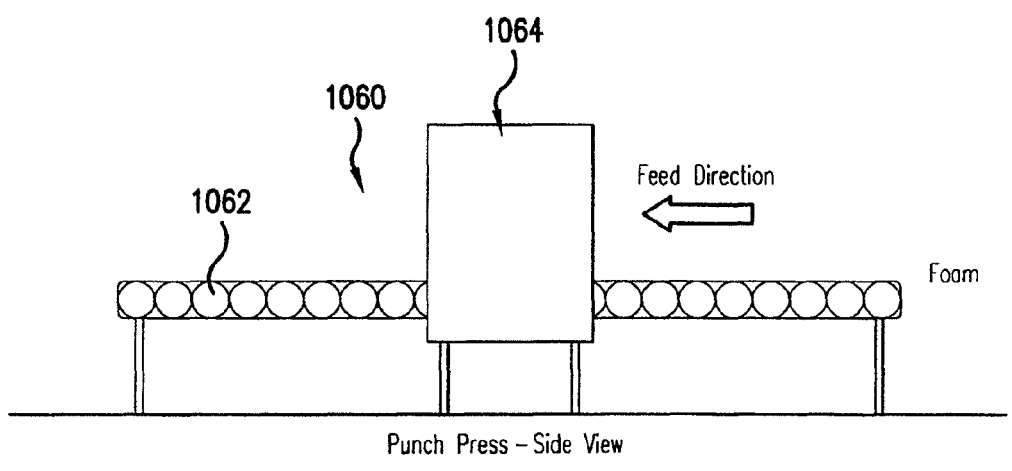
FIG. 22 shows a schematic depiction of a perforation system in the form of a pin punch press used in forming perforations in the pre-convoluted foam slab or in a convoluted piece.
Figure 23:
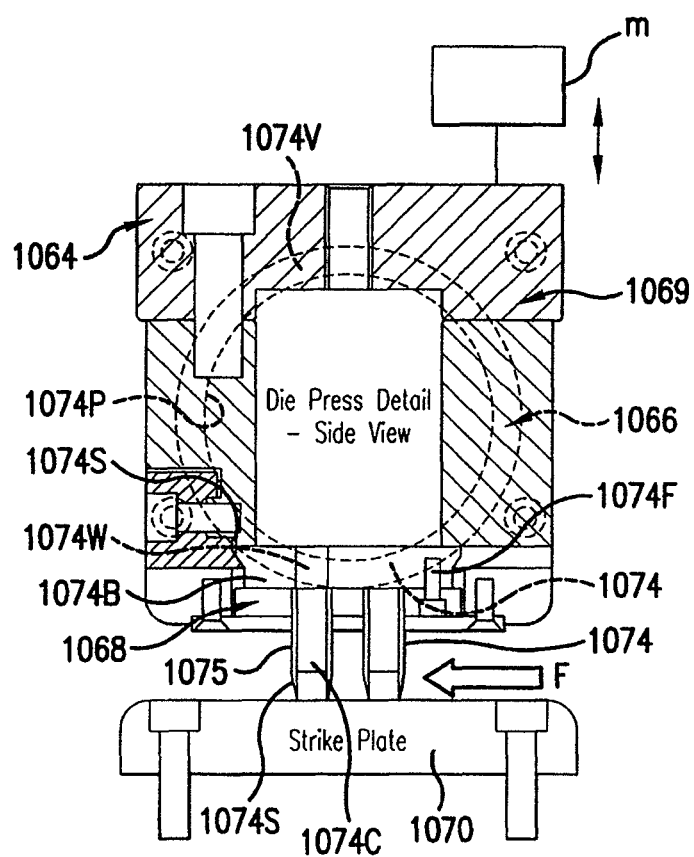
FIG. 23 shows a perforator or ventilation hole formation means featured in the perforation system shown in FIG. 22.

FIGS. 22 and 23 show a ventilation forming technique suited for use in forming ventilation means 48 in embodiments of the present disclosure featuring a ventilated layer. In the illustrated embodiment only the top layer 22 is shown as perforated, although alternate embodiments include perforations in more than one layer such as in a second visco layer such as one in an arrangement like that in FIG. 11. Also, the hole forming techniques described above and featured in FIGS. 22 and 23 can be applied to a variety of cushion material as in polyurethane foam, latex foam, gel material, a rubber, or some alternate cushioning material that can form a layer or insert component in a cushioning device of the present application.

FIG. 22 shows a perforator system which is further described in the above noted U.S. patent application Ser. No. 12/402,140 to Carpenter Co and, as shown comprises punch press assembly 1060 for forming ventilation holes in, for example, the first foam layer 22 (either prior to or after contoured surface 42 formation and either prior to or after being adjoined to base layer 24). As seen, punch press assembly 1060 comprises a conveyor assembly 1062 (e.g., a plurality of conveyor rollers) for feeding individual source slabs for subsequent use as a perforated in feed slab FS (FIG. 13—when considering the cross-sectional view as being one between a row of perforations, for example) being fed to a contour device such as the compression rollers shown in FIG. 13. In an alternate embodiment, there can be fed contoured layer products such as 22A and 22B of FIG. 13 for perforation while in a contoured state. This includes, for example, re-meshing essentially mirror image layers such as to form a configuration such as in FIG. 13A and then forming the desired apertures or through-hole. FIG. 22 further illustrates the punch press assembly 1060 further comprising die press tooling assembly 1064 with its punch tooling combination 1066 shown in greater detail in FIG. 23.

As seen in FIG. 23, die press tooling assembly 1064 includes a lower positioned punch tool set 1068 and an above positioned support structure 1069 above (with support structure, in turn, being supported by a suitable mover assembly (not shown) for reciprocation of the punch tool set 1068 with the support structure 1069 in up and down fashion). Positioned below the tool set 1068 is a strike plate 1070, which in turn is preferably supported in fixed position to provide for repeated contact of the moving upper positioned tool set 1068 therewith as an input product is rapidly fed in direction F through a gap provided between the striker plate and above positioned tool set. The feed is preferably in a die press reciprocation coordinated start and stop sequence. Also the above/below orientation described above is but one example of the multiple relative positioning that the strike plate 1070 and tool set 1068 might assume (e.g., a reverse above/below relationship or a parallel vertical plane sandwich arrangement, etc.). The illustrated tool set provides a pattern such as shown in FIG. 1 where two perforation row sets are spaced in sequence across the upper surface 26 (with larger non-perforated spaces in the longitudinal being provided based on the relative feed and punching rates, which can be varied either to increase or decrease the spacing between laterally extending punch row sets formed through upper layer 22.)

With reference to FIG. 23 there can further be seen a pair of upstream and downstream punch pins 1074 and 1075. The pair is one of many that extend in equal spaced sequence across the width (as can be seen by the pattern produced in FIG. 1). The number is preferably sufficient to fully produce a perforation pattern across the full width of the fed in product as also seen by FIG. 1. In the illustrated embodiment each of the pins, like the viewable pins 1074 and 1075, represent an end pin of a full row set to provide the desired width length row of perforation in the body being ventilated. Each pin also preferably comprises an outer sheath 1074S with narrowing (sharpened) edges defining an interior cavity 1074C and which is bordered on the top by a waste plug removal conduit which feeds to a vacuum port defined by a conduit 1074V or the like. In this way, by providing a vacuum source during a punch press cycle, the waste plug removed from the fed through layer or slab of foam material can be drawn away and readily recycled for separate use (e.g., grinding or protective filling bodies etc.).

The tool set 1068 (with its associated support movement means (not shown)) is reciprocated in the punch press assembly 1064 as in a tool set that raises and lowers the tool set in logic controlled fashion relative to a substrate positioned below as in a viscoelastic foam layer. The substrate is preferably moved in automated fashion as by turning rollers into the desired punch location in sequence relative to the timing of the punch press or can be moved manually as well. The substrate is preferably pre-sized for its intended use as in pre-sized to form, for example, a mattress core (e.g. 34 inches by 72 inches as illustrated in the embodiment shown in FIG. 1). Preferably the support on which the substrate is supported has one dimension (e.g. length) that matches that of the substrate in its ready to use size, although alternate embodiments feature longer lengths or widths cut to size to meet the end use size as in the alternate cushioning device embodiments described above. The punch press rows (e.g., two rows) of pins preferably extend for a length suited to cover either the width of length of the intended product.

FIG. 23 further shows the punch tool set as comprising base bar 1074B. Base bar 1074B provides a root support for the plurality of rows of pins and is preferably made readily detachable by way of a sliding plate arrangement as represented by the dovetail or flanged interrelationship 1074S between the base bar plate's side edge(s) and a portion of the support structure 1069. Suitable fasteners 1074F or the like can be utilized to hold the pin set in position for punch press operation in conjunction with the positioning provided by the base plate flange relationship 1074S or the like.

Thus, FIG. 23 represents a cross-section view of the punch press die with two elongated, parallel rows of pins in series. As noted the tool with the pins is preferably slidable off and on for replacement tool implementation having different sizing or spacing. The illustrated two row tool is preferred although a single pin row or staggered pin row or more than two rows are featured under the present disclosure. In the illustrated embodiment, however, there is utilized two rows and the pins are aligned along a common axis in a direction transverse to the row extension length. As noted above, the pins in the illustrated embodiment of a common size, such that there can be formed a continues series of common size holes along the whole length and width of the substrate. In alternate embodiment, the pins of the tool can be of different size or arranged to form different sized zones either over the whole surface or in specific section(s) of the ventilating pad.

Figure 24:
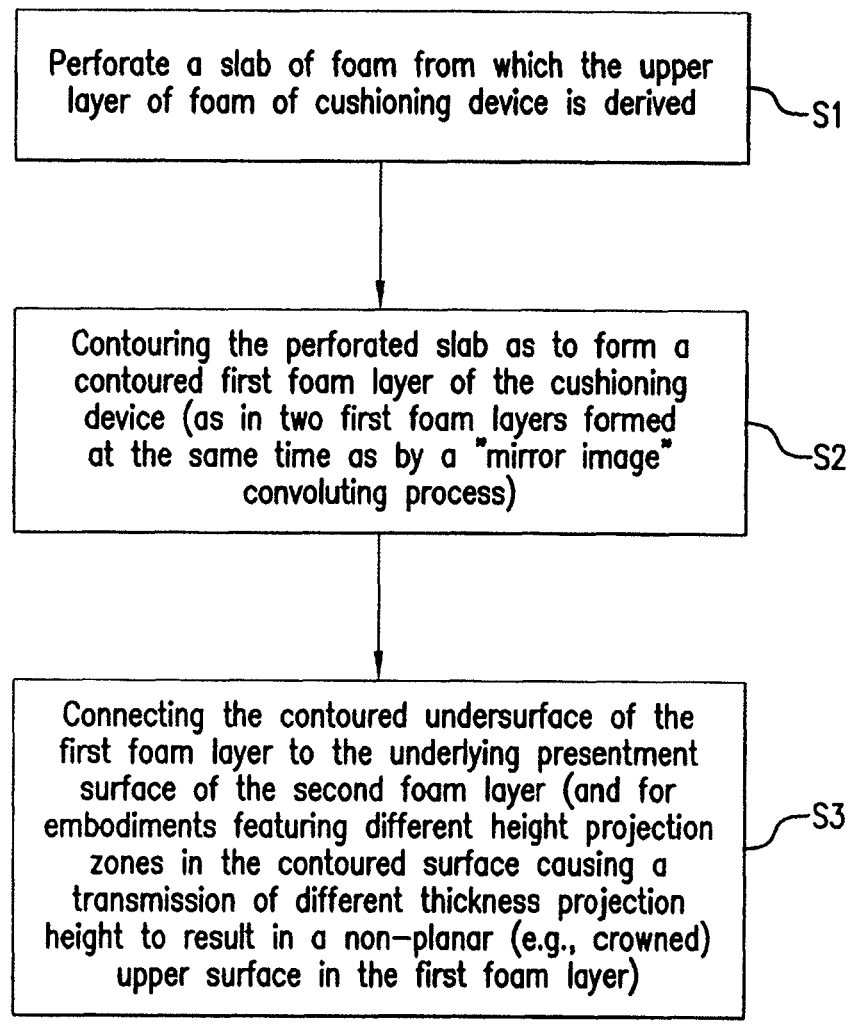
FIG. 24 shows a first embodiment manufacturing process sequence flow chart.

An embodiment of the disclosure includes a manufacturing process as outlined in FIG. 24 which includes the formation of cushioning device 20 (or 20') in a process that involves providing a foam slab as in a viscoelastic polyurethane foam slab that is subjected to a perforation process (S1) such as those described above. An embodiment includes providing a foam slab to punch press assembly 1060 featured in FIGS. 22 and 23 as in a viscoelastic solid foam slab of about twice the maximum thickness desired for layer 22 described above (e.g., about a 5 inch foam slab to be subjected to perforation) is fed to the system shown in FIG. 22, for example, and perforated to form through-holes 48

Following the perforation step the perforated foam output pad from the perforation system is then subjected to a contouring step (S2) wherein a non-planar and/or zoned projection/recess surface is provided. This includes, for example, supplying the perforated slab as the in feed slab of foam to a contouring assembly such as those described above as in that represented by tooling assembly 80 in FIG. 12. In an illustrative embodiment, the contouring is carried out as to provide for two output products each with a suitable for use contoured surface 42 as in the output products 22A and 22B shown in FIG. 13. Thus, for example, there is fed into the convoluter a single, solid perforated slab of foam which is convoluted to form, as an output, two essentially mirror image perforated foam products which have contouring in mirror image and with each output product suited for use as an upper layer in a cushion device such as cushioning device 20. Further, in a contoured arrangement and technique involving a contour system such as that described above there is avoided any scrap as each output product 22A and 22B is suited for assembly with a base layer as described below.

There is then provided a base layer to which the above noted output product is to be attached (S3) with an embodiment of the disclosure including a direct attachment as illustrated in FIG. 1. A suitable attachment technique for attaching at least a portion of the contoured undersurface of first upper layer 22 to base layer 24 includes facing a contoured undersurface of a first foam layer relative to a presentment surface of an underlying base layer and carrying out an attachment or connecting step of the contoured, non-planar surface of the upper layer to the second, base layer as in a direct adhesion technique such as one using an adhesive roll coat laminator (e.g., see RO in FIG. 18) that is utilized to apply adhesive to the tips of the convoluted pad. Once coated with an adhesive, the upper layer's undersurface is brought into contact with an exposed, facing surface of the base layer and the two are adhered together.

Thus, under one embodiment of the disclosure the following steps a) to c) are carried out in sequence to form cushioning device 20:
a) Perforate a slab of source foam material that provides a source for the resultant foam material for upper layer 22 (S1).
b) Contour (e.g., convolute) the perforated piece provided in a) with a one or more zoned patterns (inclusive of some planar zone(s) spaced longitudinally from one or more contoured zones) (S2). This zoned pattern is inclusive in one embodiment of the disclosure with projection/recess contouring that produces projections of different heights in at least some of the relative zones. Also an embodiment includes contouring as to form two "usable" essentially mirror image output products that are output by the contouring assembly.
c) Provide a means for adjoining (S3) the layer subjected to a) and b) above as in an adhesive for direct attachment; with a suitable means for adjoining including providing a roll coat laminator that applies adhesive to one or both of the layers to be joined as in applying an adhesive to the free ends or tips of the projections in the convoluted pad, and adhering the upper layer to the base layer of foam (which base layer may be, for example, a polyurethane, (e.g., a high resilience polyurethane, or latex, or any combination or subcombination of these).

Figure 25:
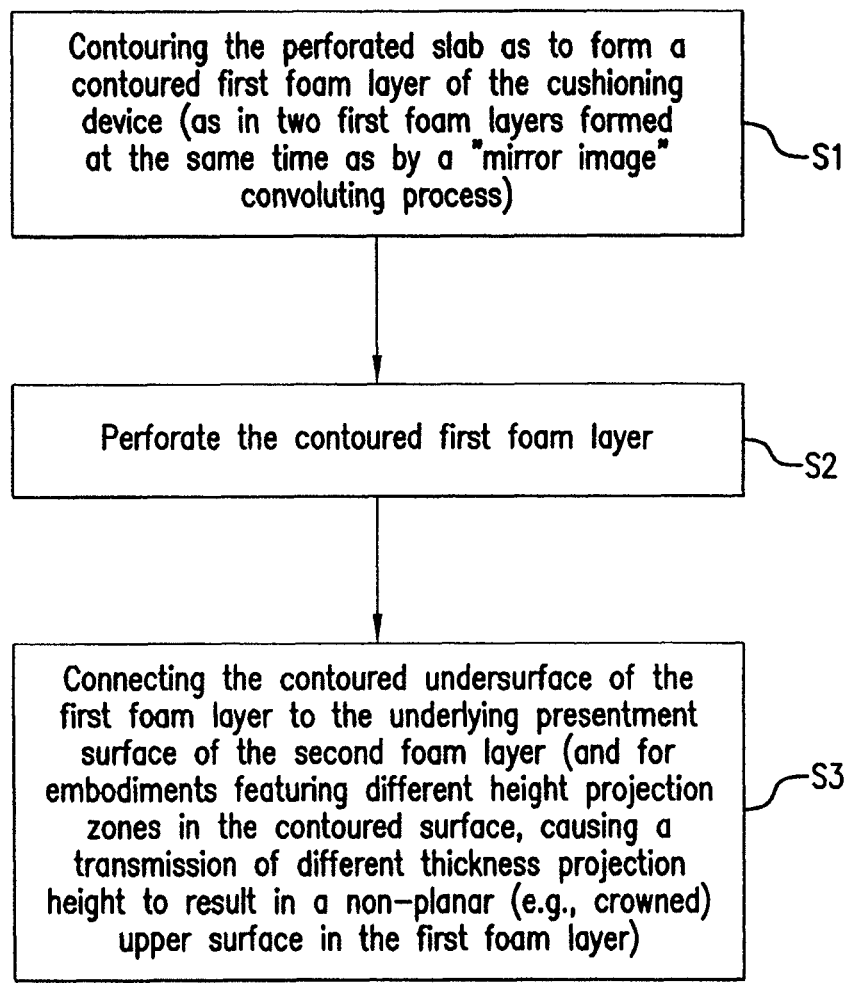
FIG. 25 shows a second embodiment manufacturing process sequence flow chart.

An alternate embodiment of the method for assembling the cushioning device 20 described above is featured in FIG. 25 and includes reversing the order of a) and b) such that a contoured surfaced pad is first generated (S1) and then subjected to perforation (S2). For example, an output product such as 22A is subjected to a post perforation process like that described above (either alone or in a re-stacked or re-meshed arrangement relative to sister layer 22B). The connection step featured in c) above is then carried out to join upper and base layers 22 and 24 (S3).

In still an alternate embodiment, a step such as c) above is carried out after a contouring step wherein a contoured layer, such as a convoluted output product 22A, is first joined with base layer 24 as by the technique c) above with the combination then (after connection of layers 22 and 24) being perforated as by a perforation system carrying out step a) above.

Also, relative to the contouring step b) described above, an example of an alternative surface contouring process includes a cutting process for the topper region pad as in a CNC saw cutting (known as contour cutting), instead of convolution.

While the invention has been described in terms of various preferred embodiments and methods for performing the procedure, those skilled in the art will recognize that various changes and modifications may be made without departing from the spirit and scope of the invention, as defined in the appended claim(s).

What is claimed is:

1. A cushioning device, comprising:
a first foam layer having an upper surface and a lower surface; and
a second foam layer having an upper surface and a lower surface, and
wherein the lower surface of the first foam layer is a contoured lower surface defining multiple zones of foam projections having free end projection surfaces connected to the lower surface of the second foam layer, with the projections within at least some of the zones having a different maximum projection height relative to a maximum projection height of the projections in another one or more of said zones, the different maximum height projections of said zones resulting in one or more crowns being formed in the upper surface of said first foam layer upon connection of the end projection surfaces to the upper surface of the second foam layer, and wherein there are 5 or more zones arranged in sequence along a longitudinal direction of elongation of said cushioning device, such that there is, in sequence, a first end zone of height H1, a first intermediate zone of height H2, a generally central region zone of height H3, a second intermediate zone and a second end zone, and wherein one of said one or more crowns is defined by said central region zone by having maximum height projections of said intermediate zones and end zones of lesser height than that of the central region zone and wherein H1<H2<H3 and wherein a height of projection of the projections in said end zones being 30 to 50% of overall height H1; the intermediate zones having a projection height of 40 to 60% of H2 and the central region zone having projections of 55 to 75% of H3.

2. The cushioning device of claim 1 wherein the lower surface of said first foam layer is connected to an intermediate layer of material positioned between said first and second foam layers.

3. The cushioning device of claim 2 wherein the intermediate layer is a layer of different characteristic foam material than each of the first and second foam layers.

4. The cushioning device of claim 1 wherein the first foam layer comprises a viscoelastic foam and said second foam layer is a layer of different characteristic foam material than the first foam layer.

5. The cushioning device of claim 4 wherein the second foam layer is formed of a foam other than viscoelastic material and has a higher 25% IFD value than the first foam layer.

6. The cushioning device of claim 1 wherein the multiple zones include a first end zone, a second end zone and an intermediate zone, with the intermediate zone being positioned between the first and second end zones, and with the intermediate zone having a greater maximum projection height as compared to the maximum projection height in said end zones as to define a thicker, intermediate zone region within the first foam layer that represents an intermediate positioned crown in said cushioning device.

7. The cushioning device of claim 6 wherein the relative thickness increase in said first foam layer in going from a minimum thickness region of one of said end zones to an uppermost portion of said crown is greater than 7 to 20%.

8. The cushioning device of claim 7 wherein there is a single, longitudinally centralized crown that has an uppermost portion that represents a thickness increase of 10 to 15% relative to said minimum thickness region and the crown has a smooth surface contour.

9. The cushioning device of claim 1 wherein the first and second intermediate zones and the first and second end zones share a common, respective maximum projection height.

10. The cushioning device of claim 1 where the free end projections of the projections in at least some of the zones feature a generally flat top free end.

11. The cushioning device of claim 1 wherein all of the zones feature projections having a generally flat top free end that are in direct connection with the second foam layer.

12. The cushioning device of claim 1 wherein said zones are comprised of zones having both different height and differently configured projections.

13. The cushioning device of claim 12 wherein said zones include at least one zone having a plurality of longitudinally spaced continuously laterally extending ridges with a generally flat top projection free end and with valleys positioned between said ridges, and wherein at least one other zone has a plurality of island type projections with generally flat top projection free ends.

14. The cushioning device of claim 1 wherein at least one of said crowns extends laterally across the first foam layer at a constant height.

15. The cushioning device of claim 1 wherein said cushioning device comprises a plurality of through holes in one or more of said zones wherein at least some of said projections extend into and through a surface defining said projections.

16. The cushioning device of claim 15 wherein said projections include generally flat top free ends with at least some of said through holes extending through and into a surface portion of said generally flat top free ends.

17. The cushioning device of claim 1 wherein said cushioning device is a mattress device and there is provided a crown in one of the zones which is positioned for user torso support and that crown is in a zone with a softer feel quality than at least one other of said zones which are of less thickness.

18. The cushioning device of claim 1 wherein said first foam layer is a viscoelastic layer that is thinner in maximum thickness than the second foam layer which is formed of non-viscoelastic foam.

19. The cushioning device of claim 18 wherein the cushioning device is a mattress device and the second foam layer is formed of a polyurethane foam and has a greater maximum thickness ratio of 1.5/1 to 4/1 relative to the first layer, with the maximum thickness range for the first layer being 1.5 to 5 inches (3.8 cm to 12.7 cm) and the second layer being 2.5 to 12 inches (6.35 to 30.48 cm).

20. The cushioning device of claim 1 wherein the first foam layer has a higher density and lower 25% IFD value than that of the second foam layer with the first foam layer having a density of 2.5 to 6 pcf (40.0 to 96.1 Kg/m$^3$) and a 25% IFD of 5-40 lbs (2.27 to 18.1 Kgs) and the second foam layer having a density of 1.5 to 4.0 pcf (24 to 64 Kg/m$^3$) and a 25% IFD of 20-50 lbs (9.1 to 22.7 Kgs).

21. The cushioning device of claim 1 wherein the first foam layer has a higher density and lower 25% IFD value than that of the second foam layer with the first foam layer having a density of 2.5 to 6 pcf (40.0 to 96.1 Kg/m$^3$) and a 25% IFD of 5-40 lbs (2.27 to 18.1 Kgs) and the second foam layer is a high resiliency polyurethane foam having a density of 1.8 to 5.0 pcf (28.8 to 80.1 Kg/m$^3$) and a 25% IFD of 15-50 lbs (6.8 to 22.7 Kgs).

22. The cushioning device of claim 1 wherein there is at least one intermediate layer between the first and second foam layers with the first layer being a viscoelastic layer and the second layer being a non-viscoelastic polyurethane foam and the intermediate layer being formed of a material selected from a group consisting of latex, viscoelastic, gel, non-viscoelastic foam, non-woven fiber and combinations thereof.

23. The cushioning device of claim 1 further comprising a layer of adhesive material between the free end projections of at least some of said zones and said second foam layer.

24. The cushioning device of claim 1 wherein the cushioning device is a mattress device and the crown presents an upper smooth surface formed on a user support directed side of that mattress device.

25. The cushioning device of claim 1 wherein the zones include opposite end zones that each have projections whose free contact ends form a contact region that encompasses 30-40% of the total area of the respective opposite end zones, a middle zone, and a pair of intermediate zones positioned between a respective one of said end zones and the middle zone, with the intermediate zones having projections and recesses that have free end projection contact surfaces that encompass 20-30% of the area of the zone in which they are present, while the middle zone has a projection and recess configuration that has the free end contact surfaces encompassing 20-30% of the area of the middle zone.

26. A cushioning device comprising an upper foam layer and a lower positioned foam layer of different characteristic foam material than the upper foam layer, with the upper foam layer having multiple thickness zones defined by different height projections from one zone to another so as to provide a thickness variation pattern, and one side of the upper foam layer is planar when not yet assembled in the cushioning device and a second side is comprised of the multiple thickness zones such that upon connection of the multiple thickness zones to the lower positioned foam layer, the height differential along a length of the upper foam layer is transmitted so as to form a non-planar, smooth surfaced crown configuration in the upper surface of the upper foam layer wherein there are 5 or more zones arranged in sequence along a longitudinal direction of elongation of said cushioning device, such that there is, in sequence, a first end zone of height H1, a first intermediate zone of height H2, a generally central region zone of height H3, a second intermediate zone and a second end zone, and wherein one of said one or more crowns is defined by said central region zone by having maximum height projections of said intermediate zones and end zones of lesser height than that of the central region zone and wherein H1<H2<H3 and wherein a height of projection of the projections in said end zones being 30 to 50% of overall height H1; the intermediate zones having a projection height of 40 to 60% of H2 and the central region zone having projections of 55 to 75% of H3.

27. The cushioning device of claim 26 wherein the cushioning device is a mattress device and wherein said upper foam layer has a feet support end region, a head support end region and a torso support region, with each end region having a lesser thickness than the torso support region, the thicker torso region defining the crown configuration in the upper surface of the first foam layer, and the torso region represents a softer feel region that manifests itself as a higher pressure relief region relative to said end regions.

28. The cushioning device of claim 27 wherein said first foam layer is of a viscoelastic material and said second foam layer has a lower density and higher 25% IFD value relative to said first layer and wherein the different height projections further include projections of different shape configuration from one zone to another of said zones.

29. The cushioning device of claim 26 wherein a free end of projections in each of said zones are essentially flat topped.

30. The cushioning device of claim 26 wherein the upper foam layer has a plurality of through-holes extending through the first foam layer and opening into recessed regions positioned between projections in at least some of the multiple zones in the upper foam layer as well as through to the free end projections of said upper foam layer such that at least some of the through-holes are covered over with an underlying layer represented by said below positioned foam layer by a direct connection or represented by an intermediate layer between the upper foam layer and the below positioned foam layer.

31. A method of forming a cushioning device comprising, providing a first foam layer, with the first foam layer having multiple thickness zones defined by different height projections from one zone to another as to provide a thickness variation pattern, and wherein the first foam layer has a first side, which is planar when not yet assembled in the cushioning device and a second side, and the second side includes the multiple thickness zones;

providing a second foam layer of a different characteristic foam material than the first foam layer; and connecting the multiple thickness zones of the first layer to said second foam layer such that the height differential along a length of the first foam layer is transmitted as to form a non-planar, smooth surfaced crown configuration in the upper surface of the first foam layer wherein there are 5 or more zones arranged in sequence along a longitudinal direction of elongation of said cushioning device, such that there is, in sequence, a first end zone of height H1, a first intermediate zone of height H2, a generally central region zone of height H3, a second intermediate zone and a second end zone, and wherein one of said one or more crowns is defined by said central region zone by having maximum height projections of said intermediate zones and end zones of lesser height than that of the central region zone and wherein H1<H2<H3 and wherein a height of projection of the projections in said end zones being 30 to 50% of overall height H1; the intermediate zones having a projection height of 40 to 60% of H2 and the central region zone having projections of 55 to 75% of H3.

32. The method of claim 31 wherein said projections have different shape configuration from zone to zone and the free ends of the projections are connected either directly to the second foam layer or indirectly via an intermediate layer or layers positioned between said first and second foam layers.

33. The method of claim 32 wherein said projections are connected to said second foam layer by an adhesive layer that comes in contact with the free end of said projections.

34. The method of claim 32 wherein connecting the projections in said first foam layer includes connecting projections having essentially flat topped ends.

35. The method of claim 34 further comprising forming multiple zones of different height and different shaped configuration projections in the first foam layer with a convoluter which includes tooling that forms essentially flat top projections in said first foam layer.

36. The method of claim 35 further comprising perforating said first foam layer.

* * * * *